(12) United States Patent
Derelöv et al.

(10) Patent No.: US 12,495,898 B2
(45) Date of Patent: Dec. 16, 2025

(54) SET OF PANELS WITH A MECHANICAL LOCKING DEVICE

(71) Applicant: Välinge Innovation AB, Viken (SE)

(72) Inventors: Peter Derelöv, Helsingborg (SE); Johan Svensson, Nyvång (SE)

(73) Assignee: VÄLINGE INNOVATION AB, Viken (SE)

( * ) Notice: Subject to any disclaimer, the term of this patent is extended or adjusted under 35 U.S.C. 154(b) by 877 days.

(21) Appl. No.: 16/553,350

(22) Filed: Aug. 28, 2019

(65) Prior Publication Data

US 2020/0069049 A1   Mar. 5, 2020

(30) Foreign Application Priority Data

Aug. 30, 2018 (SE) .................................... 1851027-1

(51) Int. Cl.
*F16B 12/24* (2006.01)
*A47B 47/00* (2006.01)
(Continued)

(52) U.S. Cl.
CPC ........ *A47B 57/588* (2013.01); *A47B 47/0066* (2013.01); *A47B 47/042* (2013.01);
(Continued)

(58) Field of Classification Search
CPC .......... F16B 12/10; F16B 12/12; F16B 12/20; F16B 12/24; F16B 12/46; F16B 2012/103;
(Continued)

(56) References Cited

U.S. PATENT DOCUMENTS

| 291,032 A | 1/1884 | Cleland |
| 634,581 A | 10/1899 | Miller |

(Continued)

FOREIGN PATENT DOCUMENTS

| CA | 2 631 998 A1 | 11/2008 |
| CH | 365 507 A | 11/1962 |

(Continued)

OTHER PUBLICATIONS

Locking Device and an Assembled Product Comprising the Panels, filed in the U.S. Patent and Trademark Office on Nov. 27, 2019.
(Continued)

*Primary Examiner* — Michael P Ferguson
(74) *Attorney, Agent, or Firm* — Boone IP Law

(57) ABSTRACT

A set including a first panel, a second panel and a mechanical locking device for locking the first panel to the second panel, wherein the first panel includes a first edge surface, the second panel includes a second panel surface, the first edge surface is facing the second panel surface in a locked position of the first and the second panel, the mechanical locking device includes at least one rod-shaped element at the first edge surface, at least one insertion groove at the second panel surface, the rod-shaped element is configured to be inserted into the insertion groove, the insertion groove extends into the second panel surface at a second angle from the second panel surface, a back panel, and at least one locking gear configured to cooperate with the back panel and a first and/or second panel groove.

16 Claims, 14 Drawing Sheets

(51) Int. Cl.
*A47B 47/04* (2006.01)
*A47B 57/58* (2006.01)
*F16B 12/10* (2006.01)
*F16B 12/20* (2006.01)
*F16B 12/46* (2006.01)
*F16B 12/12* (2006.01)

(52) U.S. Cl.
CPC .............. *F16B 12/10* (2013.01); *F16B 12/20* (2013.01); *F16B 12/24* (2013.01); *F16B 12/46* (2013.01); *F16B 12/12* (2013.01)

(58) Field of Classification Search
CPC ............ A47B 47/042; A47B 2088/902; A47B 2230/0029; A47B 2230/0037
See application file for complete search history.

(56) References Cited

U.S. PATENT DOCUMENTS

| | | | |
|---|---|---|---|
| 701,000 | A | 5/1902 | Ahrens |
| 861,911 | A | 7/1907 | Stewart |
| 881,673 | A | 3/1908 | Ellison |
| 1,533,099 | A | 4/1925 | Carroll |
| 1,534,468 | A | 4/1925 | Shea, Jr. |
| 1,800,386 | A | 4/1931 | Hoffman |
| 1,800,387 | A | 4/1931 | Greist |
| 1,802,245 | A | 4/1931 | Foretich |
| 1,954,242 | A | 4/1934 | Heppenstall |
| 2,360,451 | A | 10/1944 | Stone |
| 2,362,904 | A | 11/1944 | Kramer |
| 2,496,184 | A | 1/1950 | Von Canon |
| 2,681,483 | A | 6/1954 | Morawetz |
| 3,002,630 | A | 10/1961 | Heisser |
| 3,195,968 | A | 7/1965 | Freeman |
| 3,284,152 | A | 11/1966 | Schörghuber |
| 3,313,054 | A | 4/1967 | Madey |
| 3,347,610 | A | 10/1967 | Pilliod |
| 3,410,441 | A | 11/1968 | Rhyne |
| 3,722,704 | A | 3/1973 | Piretti |
| 3,722,971 | A | 3/1973 | Zeischegg |
| 3,742,807 | A | 7/1973 | Manning |
| 3,765,465 | A | 10/1973 | Gulistan |
| 3,784,271 | A | 1/1974 | Schreiber |
| 3,884,002 | A | 5/1975 | Logie |
| 3,885,845 | A | 5/1975 | Krieks |
| 3,981,118 | A | 9/1976 | Johnson et al. |
| 4,089,614 | A | 5/1978 | Harley |
| 4,099,293 | A | 7/1978 | Pittasch |
| 4,099,887 | A | 7/1978 | Mackenroth |
| 4,116,510 | A | 9/1978 | Franco |
| 4,142,271 | A | 3/1979 | Busse |
| 4,211,379 | A | 7/1980 | Morgan et al. |
| 4,222,544 | A | 9/1980 | Crowder |
| 4,279,397 | A | 7/1981 | Larsson |
| 4,299,067 | A | 11/1981 | Bertschi |
| 4,308,961 | A | 1/1982 | Kunce |
| 4,324,517 | A | 4/1982 | Dey |
| 4,403,886 | A | 9/1983 | Haeusler |
| 4,405,253 | A | 9/1983 | Stockum |
| 4,509,648 | A | 4/1985 | Govang |
| 4,593,734 | A | 6/1986 | Wallace |
| 4,595,105 | A | 6/1986 | Gold |
| 4,597,122 | A | 7/1986 | Handler |
| 4,615,448 | A | 10/1986 | Johnstonbaugh |
| 4,629,076 | A | 12/1986 | Amstutz et al. |
| 4,750,794 | A | 6/1988 | Vegh |
| 4,752,150 | A | 6/1988 | Salice |
| 4,815,908 | A | 3/1989 | Duran et al. |
| 4,817,900 | A | 4/1989 | Whittington et al. |
| 4,844,266 | A | 7/1989 | Small et al. |
| 4,883,331 | A | 11/1989 | Mengel |
| 4,886,326 | A | 12/1989 | Kuzyk |
| 4,888,933 | A | 12/1989 | Guomundsson |
| 4,891,897 | A | 1/1990 | Gieske et al. |
| 4,909,581 | A | 3/1990 | Haheeb |
| 4,938,625 | A | 7/1990 | Matsui |
| 4,944,416 | A | 7/1990 | Petersen et al. |
| 4,961,295 | A | 10/1990 | Kosch, Sr. et al. |
| 5,004,116 | A | 4/1991 | Cattarozzi |
| 5,018,323 | A | 5/1991 | Clausen |
| 5,109,993 | A | 5/1992 | Hutchison |
| 5,114,265 | A | 5/1992 | Grisley |
| 5,121,578 | A | 6/1992 | Holz |
| 5,125,518 | A | 6/1992 | Ward |
| 5,138,803 | A | 8/1992 | Grossen |
| 5,209,556 | A | 5/1993 | Anderson |
| 5,212,925 | A | 5/1993 | McClinton |
| 5,299,509 | A | 4/1994 | Ballard |
| 5,360,121 | A | 11/1994 | Sothman |
| 5,375,802 | A | 12/1994 | Branham, II |
| 5,423,155 | A | 6/1995 | Bauer |
| 5,451,102 | A | 9/1995 | Chuan |
| 5,458,433 | A | 10/1995 | Stastny |
| 5,471,804 | A | 12/1995 | Winter, IV |
| 5,475,960 | A | 12/1995 | Lindal |
| 5,499,667 | A | 3/1996 | Nakanishi |
| 5,499,886 | A | 3/1996 | Short et al. |
| 5,507,331 | A | 4/1996 | Nakanishi |
| 5,527,103 | A | 6/1996 | Pittman |
| 5,658,086 | A | 8/1997 | Brokaw et al. |
| 5,711,115 | A | 1/1998 | Wirt |
| 5,775,521 | A | 7/1998 | Tisbo |
| 5,810,505 | A | 9/1998 | Henriott |
| 5,893,617 | A | 4/1999 | Lee |
| 5,941,026 | A | 8/1999 | Eisenreich |
| 5,944,294 | A | 8/1999 | Baer |
| 5,950,389 | A | 9/1999 | Porter |
| 6,045,290 | A | 4/2000 | Nocievski |
| 6,050,426 | A | 4/2000 | Leurdijk |
| 6,142,436 | A | 11/2000 | Thurston et al. |
| 6,312,186 | B1 | 11/2001 | Röck et al. |
| 6,349,507 | B1 | 2/2002 | Muellerleile |
| 6,363,645 | B1 | 4/2002 | Hunter |
| 6,413,007 | B1 | 7/2002 | Lambright |
| 6,418,683 | B1 | 7/2002 | Martensson |
| 6,491,172 | B2 | 12/2002 | Chance |
| 6,505,452 | B1 | 1/2003 | Hannig |
| 6,547,086 | B1 | 4/2003 | Harvey |
| 6,578,498 | B1 | 6/2003 | Draudt et al. |
| 6,675,979 | B2 | 1/2004 | Taylor |
| D486,676 | S | 2/2004 | Campbell et al. |
| 6,769,219 | B2 | 8/2004 | Schwitte et al. |
| 6,772,890 | B2 | 8/2004 | Campbell et al. |
| 6,827,028 | B1 | 12/2004 | Callaway |
| 6,971,614 | B2 | 12/2005 | Fischer et al. |
| 7,125,196 | B2 * | 10/2006 | Hinsberger ........ A47B 47/0033 312/265.5 |
| 7,127,860 | B2 | 10/2006 | Pervan |
| 7,223,045 | B2 | 5/2007 | Migli |
| 7,228,977 | B2 | 6/2007 | Perkins et al. |
| 7,300,120 | B2 | 11/2007 | Shin |
| 7,451,535 | B2 | 11/2008 | Wells et al. |
| 7,451,578 | B2 | 11/2008 | Hannig |
| 7,584,583 | B2 | 9/2009 | Bergelin et al. |
| 7,614,350 | B2 | 11/2009 | Tuttle et al. |
| 7,621,092 | B2 | 11/2009 | Groeke et al. |
| 7,641,414 | B1 | 1/2010 | Joyce |
| 7,717,278 | B2 | 5/2010 | Kao |
| 7,721,503 | B2 | 5/2010 | Pervan et al. |
| 7,793,450 | B2 | 9/2010 | Chasmer et al. |
| 7,818,939 | B2 | 10/2010 | Bearinger |
| 7,998,549 | B2 | 8/2011 | Susnjara |
| 8,033,074 | B2 | 10/2011 | Pervan |
| 8,038,363 | B2 | 10/2011 | Hannig |
| 8,042,311 | B2 | 10/2011 | Pervan |
| 8,146,754 | B2 | 4/2012 | Apgood |
| 8,220,217 | B2 | 7/2012 | Muehlebach |
| 8,234,830 | B2 | 8/2012 | Pervan |
| 8,365,499 | B2 | 2/2013 | Nilsson et al. |
| 8,387,327 | B2 | 3/2013 | Pervan |
| 8,464,408 | B2 | 6/2013 | Hazzard |
| 8,495,849 | B2 | 7/2013 | Pervan |
| 8,505,257 | B2 | 8/2013 | Boo et al. |

(56) References Cited

U.S. PATENT DOCUMENTS

| | | |
|---|---|---|
| 8,544,230 B2 | 10/2013 | Pervan |
| 8,596,013 B2 | 12/2013 | Boo |
| 8,602,227 B1 | 12/2013 | McDonald |
| 8,615,952 B2 | 12/2013 | Engström |
| 8,713,886 B2 | 5/2014 | Pervan |
| 8,745,952 B2 | 6/2014 | Perra |
| 8,764,137 B2 | 7/2014 | Fehre |
| 8,776,473 B2 | 7/2014 | Pervan |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 | 11/2014 | Håkansson et al. |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 | 7/2020 | Derelöv |
| 10,731,688 B2 | 8/2020 | Brännström et al. |
| 10,736,416 B2 | 8/2020 | Derelöv et al. |
| 10,830,266 B2 | 11/2020 | Fridlund |
| 10,830,268 B2 | 11/2020 | Boo |
| 10,871,179 B2 | 12/2020 | Håkansson et al. |
| 10,876,562 B2 | 12/2020 | Pervan |
| 10,876,563 B2 | 12/2020 | Derelöv et al. |
| 10,968,936 B2 | 4/2021 | Boo et al. |
| 11,047,415 B2 * | 6/2021 | Leistert ................ F16B 12/12 |
| 11,076,691 B2 | 8/2021 | Boo |
| 11,083,287 B2 | 8/2021 | Boo et al. |
| 11,098,484 B2 | 8/2021 | Derelöv |
| 11,137,007 B2 | 10/2021 | Fridlund |
| 11,204,051 B2 | 12/2021 | Brännström et al. |
| 11,246,415 B2 | 2/2022 | Derelöv et al. |
| 11,272,783 B2 | 3/2022 | Derelöv |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2008/0282594 A1 | 11/2008 | Swavola, II |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |

(56) References Cited

U.S. PATENT DOCUMENTS

| | | |
|---|---|---|
| 2020/0069048 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |
| 2021/0148392 A1 | 5/2021 | Brännström et al. |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |
| 2021/0262507 A1 | 8/2021 | Svensson et al. |
| 2021/0262508 A1 | 8/2021 | Svensson et al. |
| 2021/0276108 A1 | 9/2021 | Derelöv et al. |
| 2021/0285480 A1 | 9/2021 | Derelöv et al. |
| 2021/0381251 A1 | 12/2021 | Svensson |
| 2022/0018373 A1 | 1/2022 | Boo |
| 2022/0049735 A1 | 2/2022 | Meijer |

FOREIGN PATENT DOCUMENTS

| | | | | |
|---|---|---|---|---|
| CH | 685 276 A5 | 5/1995 | | |
| CH | 696 889 A5 | 1/2008 | | |
| CH | 698 988 B1 | 12/2009 | | |
| CH | 705 082 A2 | 12/2012 | | |
| CN | 101099618 A | 1/2008 | | |
| CN | 102 917 616 A | 2/2013 | | |
| CN | 203424576 U | 2/2014 | | |
| DE | 1107910 B | 5/1961 | | |
| DE | 24 14 104 A1 | 10/1975 | | |
| DE | 25 14 357 A1 | 10/1975 | | |
| DE | 31 03 281 A1 | 8/1982 | | |
| DE | 228 872 A1 | 10/1985 | | |
| DE | 42 29 115 A1 | 3/1993 | | |
| DE | 93 02 568 | * 4/1993 | ............. | F16B 12/46 |
| DE | 94 17 168 U1 | 2/1995 | | |
| DE | 198 31 936 A1 | 2/1999 | | |
| DE | 298 20 031 U1 | 2/1999 | | |
| DE | 198 05 538 A1 | 8/1999 | | |
| DE | 203 04 761 U1 | 4/2004 | | |
| DE | 299 24 630 U1 | 5/2004 | | |
| DE | 20 2005 019 986 U1 | 2/2006 | | |
| DE | 20 2004 017 486 U1 | 4/2006 | | |
| DE | 10 2005 007 451 | * 8/2008 | ............. | F16B 12/46 |
| DE | 20 2009 008 825 U1 | 10/2009 | | |
| DE | 10 2008 035 293 A1 | 2/2010 | | |
| DE | 10 2009 041 142 A1 | 3/2011 | | |
| DE | 10 2011 057 018 A1 | 6/2013 | | |
| DE | 10 2013 008 595 A1 | 11/2013 | | |
| DE | 10 2015 103 429 A1 | 10/2015 | | |
| DE | 10 2014 110 124 A1 | 1/2016 | | |
| DE | 20 2017 101 856 U1 | 4/2017 | | |
| EP | 0 060 203 A2 | 9/1982 | | |
| EP | 0 060 203 A3 | 9/1982 | | |
| EP | 0 357 129 A1 | 3/1990 | | |
| EP | 0 362 968 A | 4/1990 | | |
| EP | 0 675 332 A2 | 10/1995 | | |
| EP | 0 871 156 A2 | 10/1998 | | |
| EP | 1 048 423 A2 | 11/2000 | | |
| EP | 1 048 423 B9 | 5/2005 | | |
| EP | 1 650 375 A1 | 4/2006 | | |
| EP | 1 650 375 A8 | 4/2006 | | |
| EP | 1 671 562 A1 | 6/2006 | | |
| EP | 1 922 954 A1 | 5/2008 | | |
| EP | 2 017 403 A2 | 1/2009 | | |
| EP | 1 922 954 B1 | 7/2009 | | |
| EP | 2 333 353 A2 | 6/2011 | | |
| EP | 1 863 984 B1 | 11/2011 | | |
| EP | 2 487 373 A1 | 8/2012 | | |
| EP | 3 031 998 A1 | 6/2016 | | |
| FR | 2 517 187 A1 | 6/1983 | | |
| FR | 2 597 173 A1 | 10/1987 | | |
| FR | 2 602 013 A1 | 1/1988 | | |
| FR | 3 019 862 | * 7/2017 | ............. | F16B 12/24 |
| FR | 3 044 723 | * 12/2017 | ............. | F16B 12/20 |
| GB | 245332 | 1/1926 | | |
| GB | 1 022 377 A | 3/1966 | | |
| GB | 2 163 825 A | 3/1986 | | |
| GB | 2 315 988 A | 2/1998 | | |
| GB | 2 445 954 A | 7/2008 | | |
| GB | 2 482 213 A | 1/2012 | | |
| GB | 2 520 927 A | 6/2015 | | |
| JP | 50-138972 A | 11/1975 | | |
| JP | S53-113160 U | 9/1978 | | |
| JP | H06-22606 U | 3/1994 | | |
| JP | 2003-239921 A | 8/2003 | | |
| KR | 10-1147274 B1 | 5/2012 | | |
| KR | 2014-0042314 A | 4/2014 | | |
| WO | WO 87/07339 A1 | 12/1987 | | |
| WO | WO 90/07066 | 6/1990 | | |
| WO | WO 99/22150 A1 | 5/1999 | | |
| WO | WO 99/41508 A2 | 8/1999 | | |
| WO | WO 00/66856 A1 | 11/2000 | | |
| WO | WO 01/53628 A1 | 7/2001 | | |
| WO | WO 02/055809 A1 | 7/2002 | | |
| WO | WO 02/055810 A1 | 7/2002 | | |
| WO | WO 03/083234 A1 | 10/2003 | | |
| WO | WO 2004/079130 A1 | 9/2004 | | |
| WO | WO 2005/068747 A1 | 7/2005 | | |
| WO | WO 2006/043893 A1 | 4/2006 | | |
| WO | WO 2006/104436 A1 | 10/2006 | | |
| WO | WO 2007/015669 A2 | 2/2007 | | |
| WO | Wo 2007/015669 A3 | 2/2007 | | |
| WO | WO 2008/004960 23 | 1/2008 | | |
| WO | WO 2008/004960 A2 | 1/2008 | | |
| WO | WO 2008/004960 A8 | 1/2008 | | |
| WO | WO 2008/017281 A1 | 2/2008 | | |
| WO | WO 2008/150234 A1 | 12/2008 | | |
| WO | WO 2009/136195 A1 | 11/2009 | | |
| WO | WO 2010/087752 A1 | 8/2010 | | |
| WO | WO 2011/151758 A2 | 12/2011 | | |
| WO | WO 2011/151758 A3 | 12/2011 | | |
| WO | WO 2012/095454 A1 | 7/2012 | | |
| WO | WO 2012/154113 A1 | 11/2012 | | |
| WO | WO 2013/009257 A1 | 1/2013 | | |
| WO | WO 2013/025163 A1 | 2/2013 | | |
| WO | WO 2013/080160 A1 | 6/2013 | | |
| WO | WO 2013/118075 A1 | 8/2013 | | |
| WO | WO 2014/072080 A1 | 5/2014 | | |
| WO | WO 2014/121410 A1 | 8/2014 | | |
| WO | WO 2015/015603 A1 | 2/2015 | | |
| WO | WO 2015/038059 A1 | 3/2015 | | |
| WO | WO 2015/105449 A1 | 7/2015 | | |
| WO | WO 2015/105450 A1 | 7/2015 | | |
| WO | WO 2015/105451 A1 | 7/2015 | | |
| WO | WO 2016/099396 A1 | 6/2016 | | |
| WO | WO 2016/175701 A1 | 11/2016 | | |
| WO | WO 2016/187533 A1 | 11/2016 | | |
| WO | WO 2017/131574 A1 | 8/2017 | | |
| WO | WO 2017/138874 A1 | 8/2017 | | |
| WO | WO 2018/004435 A1 | 1/2018 | | |
| WO | WO 2018/080387 A1 | 5/2018 | | |
| WO | WO 2019/125291 A1 | 6/2019 | | |
| WO | WO 2019/125292 A1 | 6/2019 | | |

OTHER PUBLICATIONS

Extended European Search Report mailed Apr. 8, 2022 in EP 19854149.2, European Patent Office, Munich, DE, 8 pages.

Notice of Reasons for Refusal with English translation mailed on Jun. 20, 2023, by the Japanese Patent Office for Japanese Application No. (2021-509806), 10 pages.

* cited by examiner

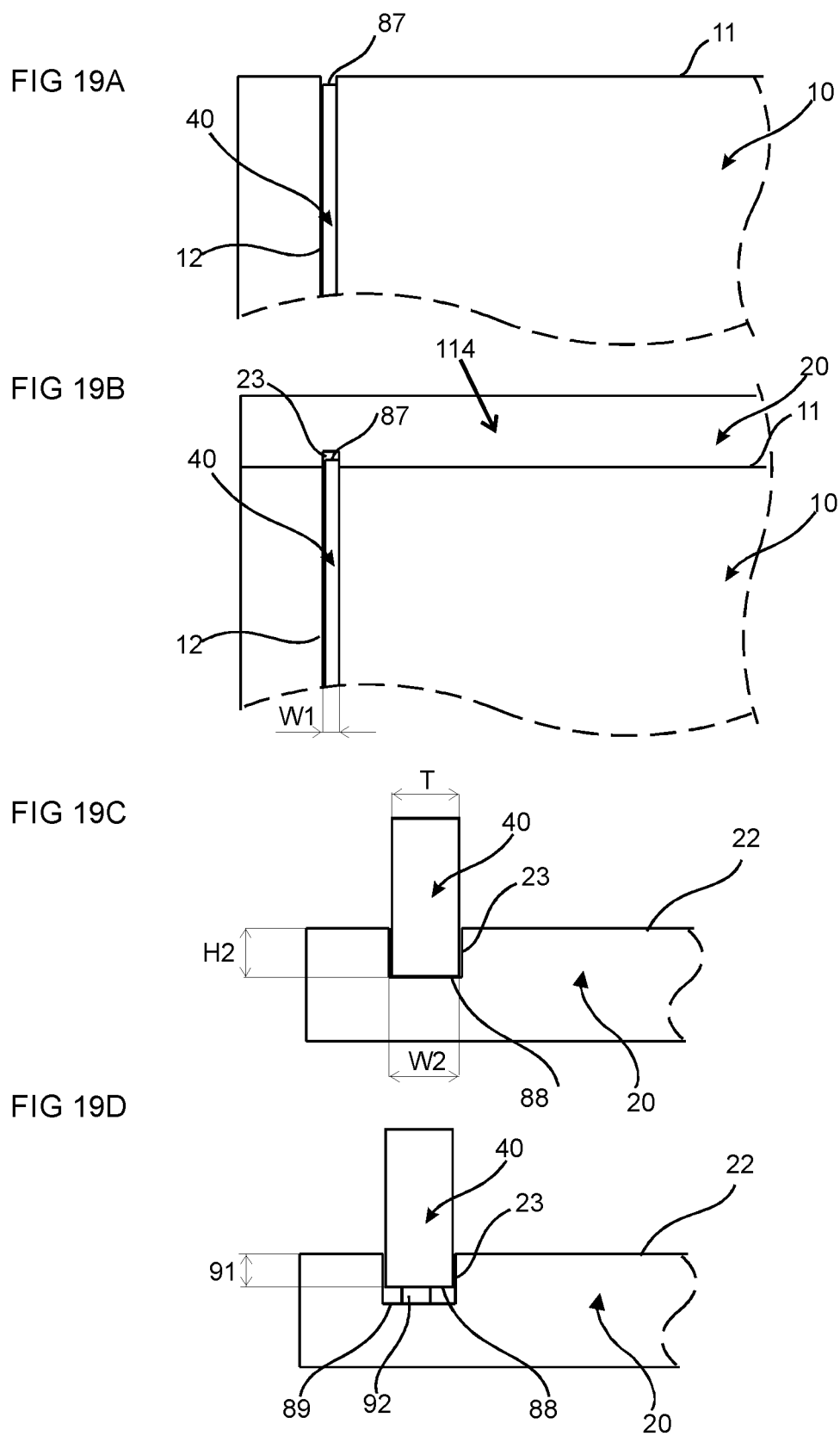

SET OF PANELS WITH A MECHANICAL LOCKING DEVICE

CROSS REFERENCE TO RELATED APPLICATIONS

The present application claims the benefit of Swedish Application No. 1851027-1, filed on Aug. 30, 2018. The entire contents of Swedish Application No. 1851027-1 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component.

TECHNICAL BACKGROUND

A furniture product provided with a mechanical locking device is known in the art, as evidenced by WO2015/038059. The furniture product comprises a first panel connected perpendicular to a second panel by a mechanical locking device comprising a flexible tongue in an insertion groove.

The above description of various known aspects is the applicant's characterization of such, and is not an admission that any of the above description is considered as prior art.

Embodiments of the present invention address a need to provide panels that may be easily assembled.

SUMMARY

It is an object of certain aspects of the present invention to provide an improvement over the above described techniques and known art; particularly to facilitate assembling of panels configured to be assembled without the need of using any tools.

A further object of at least certain aspects of the present invention is to facilitate assembling of panels configured to be assembled with a locking device that is easy to manufacture and to use, which reduces the risk of incorrect installation thereof.

A further object of at least certain aspects of the present invention is to facilitate assembling of panels configured to be assembled in a more stable and aesthetic way.

At least some of these and other objects and advantages that will be apparent from the description have been achieved by a set comprising a first panel, a second panel and a mechanical locking device for locking the first panel to the second panel, wherein the first panel comprises a first edge surface, the second panel comprises a second panel surface, the first edge surface is facing and/or is parallel with the second panel surface in a locked position of the first and the second panel, the mechanical locking device comprises at least one rod-shaped element at the first edge surface and at least one insertion groove at the second panel surface, the rod-shaped element is configured to be inserted into the insertion groove, the rod-shaped element extends at a first angle from the first edge surface, the insertion groove extends into the second panel surface at a second angle from the second panel surface, the mechanical locking device further comprises a first panel groove on a first panel surface on the first panel, and/or a second panel groove on the second panel surface of the second panel, a back panel configured to be inserted in and to cooperate with, the first and second panel groove, wherein the first angle is within the range of about 30° to about 60°, or within the range of about 40° to about 50°, or about 45°, and at least one locking gear configured to cooperate with the first and/or second panel groove, for locking of the first panel to the second panel.

The locking gear 50 may be configured to cooperate with the back panel 40 for locking the back panel 40 to the first panel 10 and or to the second panel 20.

According to an aspect a width of the first and/or second panel groove minus a thickness of the back panel is larger than or essentially the same as an extension of the rod-shaped element along the first edge surface.

According to an aspect the rod-shaped element is arranged in a rod element groove in the first edge surface.

According to an aspect a width of the first panel groove is essentially the same as the width of the second panel groove.

According to an aspect, when the first and the second panel are in an assembled state, but before the locking gear locks the first panel to the second panel and the first and second panel enters the final locked position, the first panel groove and the second panel groove are displaced about 0.1 mm to about 0.6 mm, or about 0.2 mm to about 0.3 mm, in relation to each other.

According to an aspect the first panel comprises a second edge surface, the second panel comprises a third edge surface, the first panel groove is substantially parallel to the second edge surface and the second panel groove is substantially parallel to the third edge surface.

According to an aspect the first panel groove extends substantially along the entire second edge surface and the second panel groove extends essentially along the entire third edge surface.

According to an aspect the first panel groove and/or the second panel groove is bottom-ended.

According to an aspect the locking gear is flexible.

According to an aspect the locking gear comprises a spring.

According to an aspect the locking gear comprises a wedge element.

According to an aspect an extension of the back panel from the first edge of the first panel, when one first panel, one second panel and one back panel have been assembled, is less than an extension of the rod shaped element from the first edge surface.

According to an aspect the core of the first panel and/or of the second panel may be a wood-based core, such as MDF, HDF, OSB, WPC, plywood or particleboard. The core may also be a plastic core comprising thermosetting plastic or thermoplastic, e.g., vinyl, PVC, PU or PET. The plastic core may comprise fillers.

The first panel and/or the second panel may also be of solid wood.

The first panel and/or the second panel may be provided with a decorative layer, such as a foil or a veneer, on one or more surfaces.

At least some of the above identified and other objects and advantages that may be apparent from the description have been achieved by a locking device for a furniture product in accordance with the above.

BRIEF DESCRIPTION OF THE DRAWINGS

These and other aspects, features and advantages of which embodiments of the invention are capable of, will be appar

FIGS. 19A-19D show enlargements of parts of a set during assembling.

DETAILED DESCRIPTION

Figure 1A:
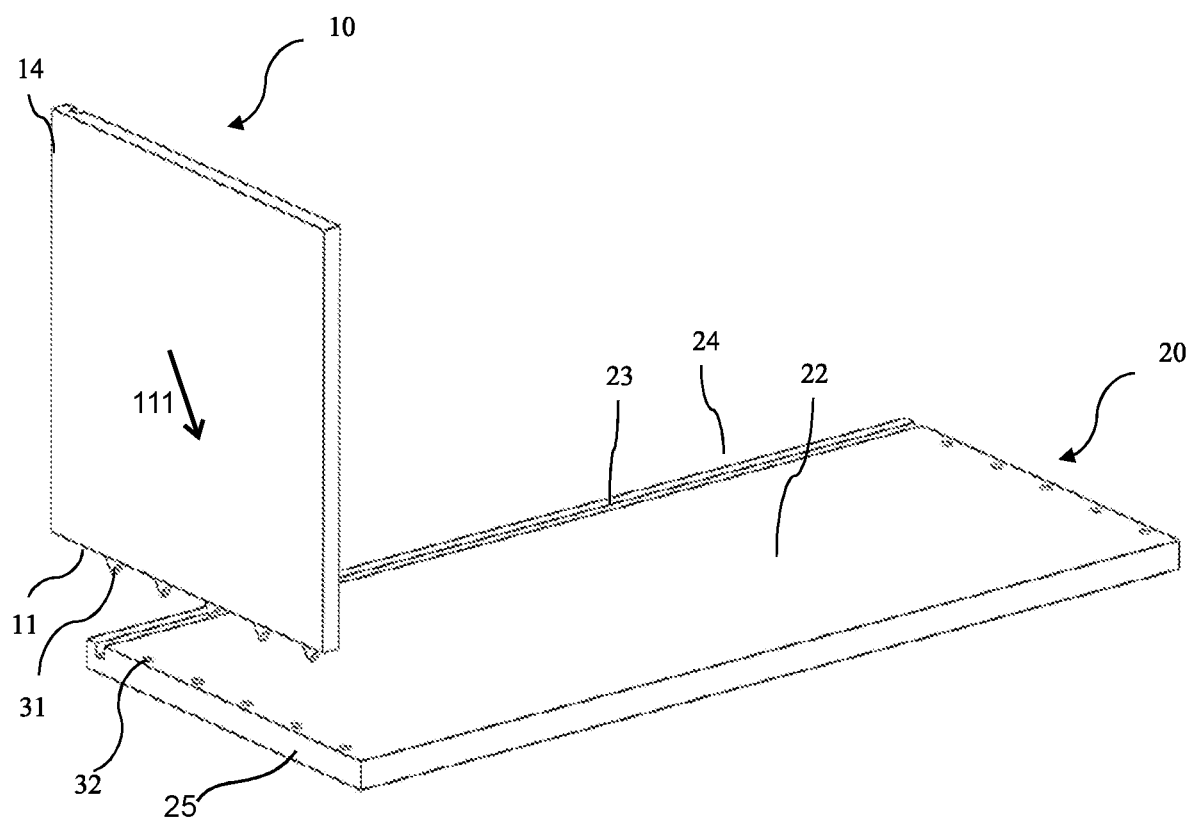
- FIG. 1A shows a 3D view from above of a set in an unassembled state of an aspect of the invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In the drawings and specification, there have been disclosed exemplary aspects of the disclosure. However, many variations and modifications may be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation, for example, definition of dimensions such as width or breadth or height or length or diameter depends on how exemplary aspects are depicted, hence, if depicted differently, a shown width or diameter in one depiction is a length or thickness in another depiction.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

The different aspects, alternatives and embodiments of the invention disclosed herein may be combined with one or more of the other aspects, alternatives and embodiments described herein. Two or more aspects may be combined.

Embodiments of the invention are shown in FIGS. 1-18 including a set comprising a first panel 10, a second panel 20 and a mechanical locking device for locking of the first panel 10 to the second panel 20. The first panel 10 comprises a first edge surface 11 a first panel surface 13. The second panel 20 comprises a second panel surface 22. The first edge surface 11 is facing or parallel to the second panel surface 22 in a locked position of the first and the second panel 10, 20. The mechanical locking device comprises at least one element 31 at the first edge surface 11 and at least one insertion groove 32 at the second panel surface 22. The element 31 may be rod-shaped. The rod-shaped element 31 is configured to be inserted into the insertion groove 32. The rod-shaped element 31 extends at a first angle α1 from the first edge surface 11 and the insertion groove 32 extends into the second panel surface 22 at a second angle α2 from the second panel surface 22. When there are more than one element 31, each element 31 may be arranged parallel to each other element 31. When there are more than one insertion grooves 32, each insertion groove 32 may be arranged parallel to each other insertion groove 32. The mechanical locking device further comprises a first panel groove 12 on the first panel surface 13 on the first panel 10, and/or a second panel groove 23 on the second panel surface 22 of the second panel 20, a back panel 40 configured to be inserted in and to cooperate with, the first and second panel groove 12, 23, wherein the first angle α1 is within the range of about 30° to about 60°, or within the range of about 40° to about 50°, or about 45°. The mechanical locking device also comprises at least one locking gear 50 configured to cooperate with at least the first and second panel groove 12, 23, for locking of the first panel 10 to the second panel 20.

The locking gear 50 may be configured to cooperate with the back panel 40 for locking the back panel 40 to the first panel 10 and or to the second panel 20.

The second panel 20 may comprise a fourth edge surface 25 and the insertion groove 32 may be positioned adjacent the fourth edge surface 25. The set may be configured for locking the first panel 10 to the second panel 20 with the first panel surface 13 parallel or essentially parallel to the fourth edge surface 25.

The first panel 10 and the second panel 20 may be panels for a furniture product and may be a part of a frame of a furniture product.

The set may be configured for locking the first panel 10 to the second panel 20 with the first panel 10 perpendicular or essentially perpendicular to the second panel surface 22.

FIGS. 1A-3, 13-15 disclose embodiments of the set in an unassembled state. FIGS. 4A-12B disclose embodiments of the set in an assembled state. The set may be assembled by displacing the first panel 10 relative the second panel 20 in an assembly direction 111, 112, 114 which is essentially parallel with the first panel surface 13.

The assembly direction 111, 112, 114 may be essentially parallel with the first angle α1 and/or the second angle α2. The insertion groove 32 may be a drill hole. The drill hole may be a bottom-ended drill hole.

The insertion groove 32 may have a diameter D2.

Figure 13:
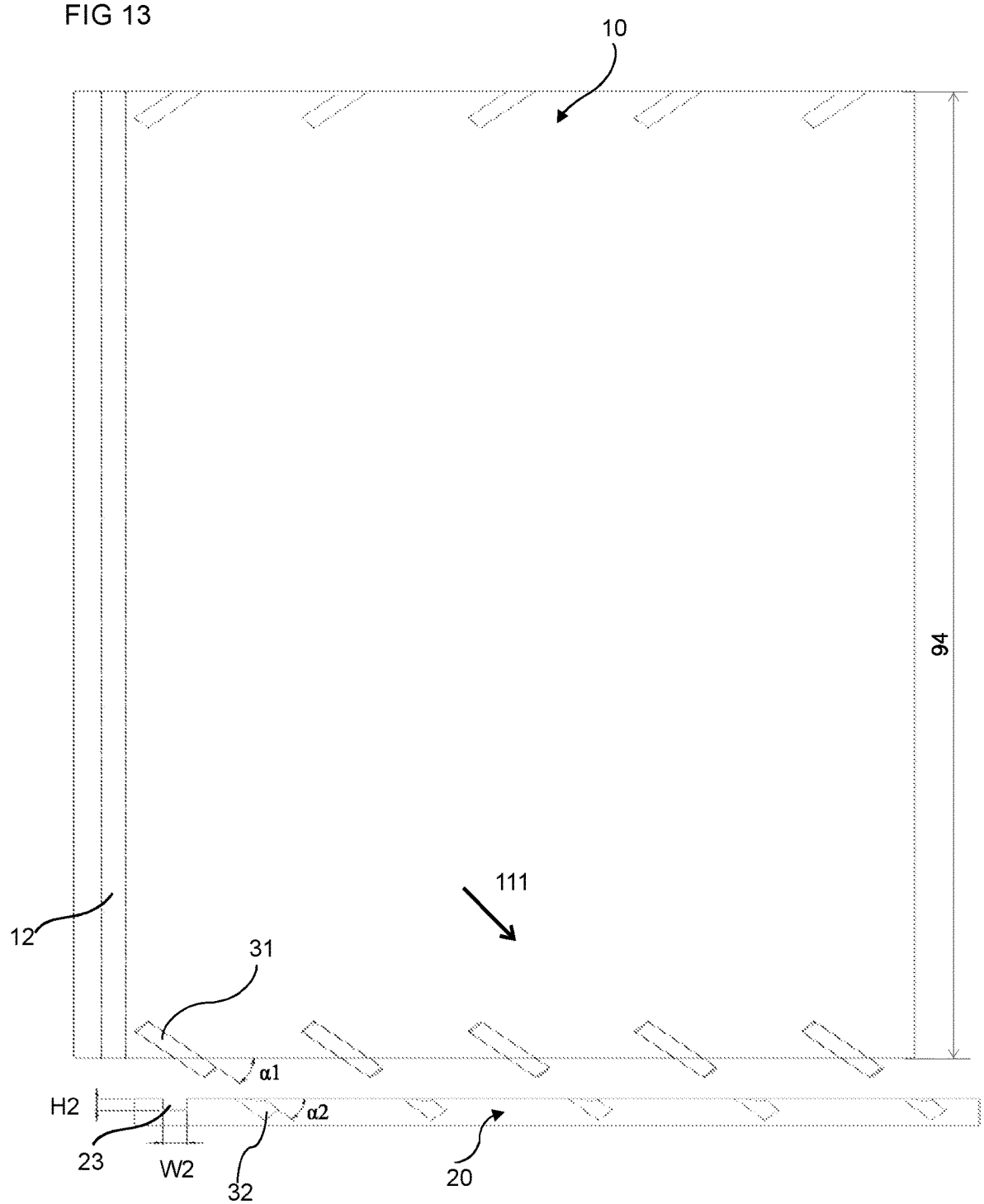
FIG. 13 shows a side view of a set in an unassembled state of an aspect of the invention.
Figure 14:
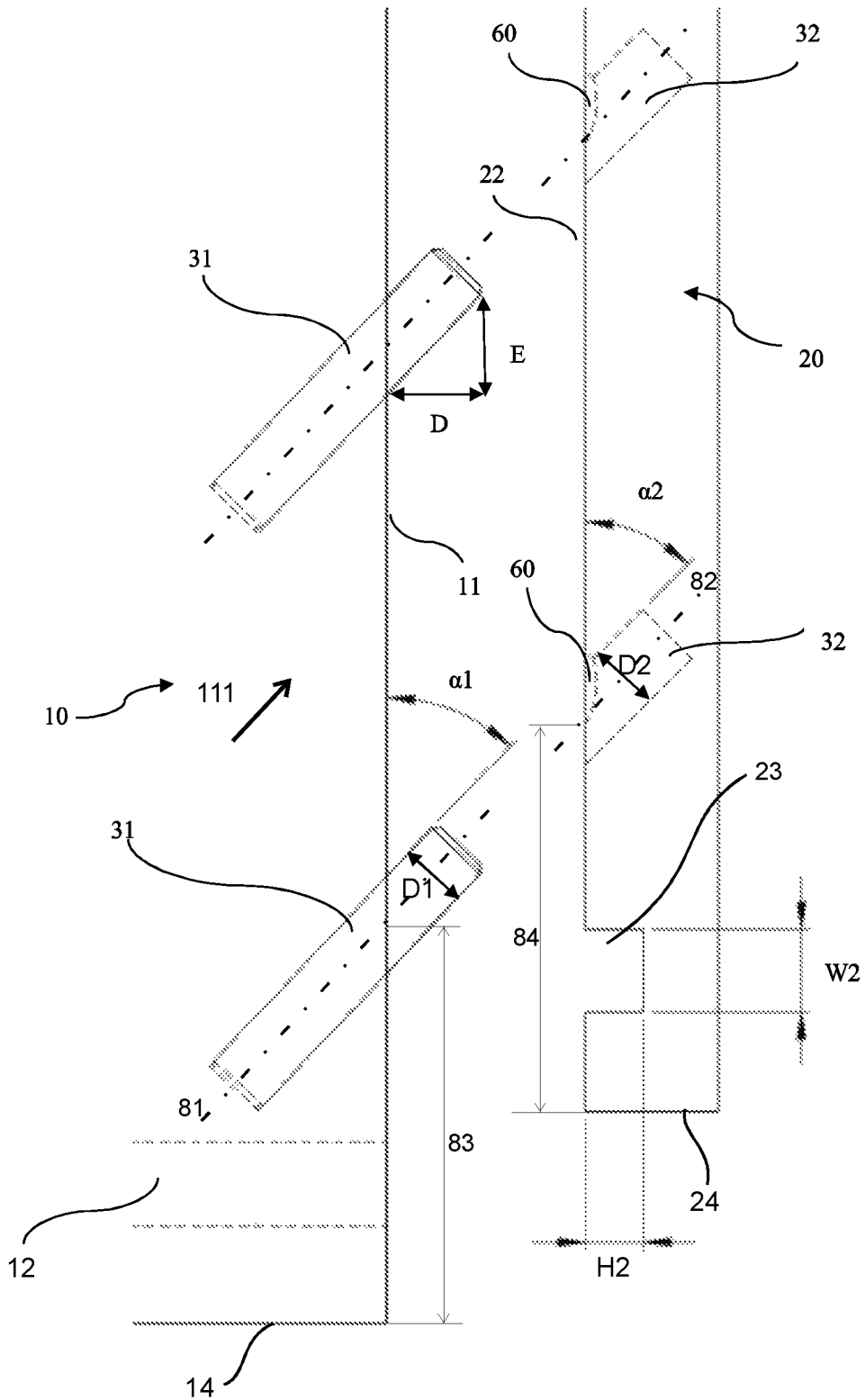
FIG. 14 shows an enlargement of part of the set shown in FIG. 13.

The insertion groove 32 may comprise a chamfer 60 or a rounding, which is configured to guide the rod shaped element during assembling, as shown in FIGS. 13 and 14.

The rod-shaped element 31 may be arranged in a rod element groove 36 on the first edge surface 11 on the first panel 10 or on the second panel surface 22 on the second panel 20.

The rod-shaped element 31 may have a diameter D1. The diameter D2 of the insertion groove 32 may be larger than the diameter D1 of the rod-shaped element 31. The diameter D2 of the insertion groove 32 may be about 0.3 to about 0.8 mm larger than the diameter D1 of the rod-shaped element 31 for optimal assembly.

The locking gear 50 may be assembled to the set of panels when the first panel 10, the second panel 20 and the back panel 40 have been assembled, and is inserted in the first panel groove 12 and and/or the second panel groove 23, and thereby locks the first panel 10 to the second panel 20.

The locking gear 50 may lock the back panel 40 to the first panel groove 12 and and/or the second panel groove and thereby hinders the first panel 10 to be displaced in relation to the second panel 20 in a direction opposite to the assembly direction In one aspect, the locking gear 50 cooperates with the back panel 40 for locking of the back panel 40 to the first panel 10 and/or the second panel 20.

The first panel groove 12 on the first panel surface 13 may comprise a width W1.

The second panel groove 23 on the second panel surface 22 may comprise a width W2.

The width W1 of the first panel groove 12 may be essentially the same as the width W2 of the second panel groove 23.

Figure 4A:
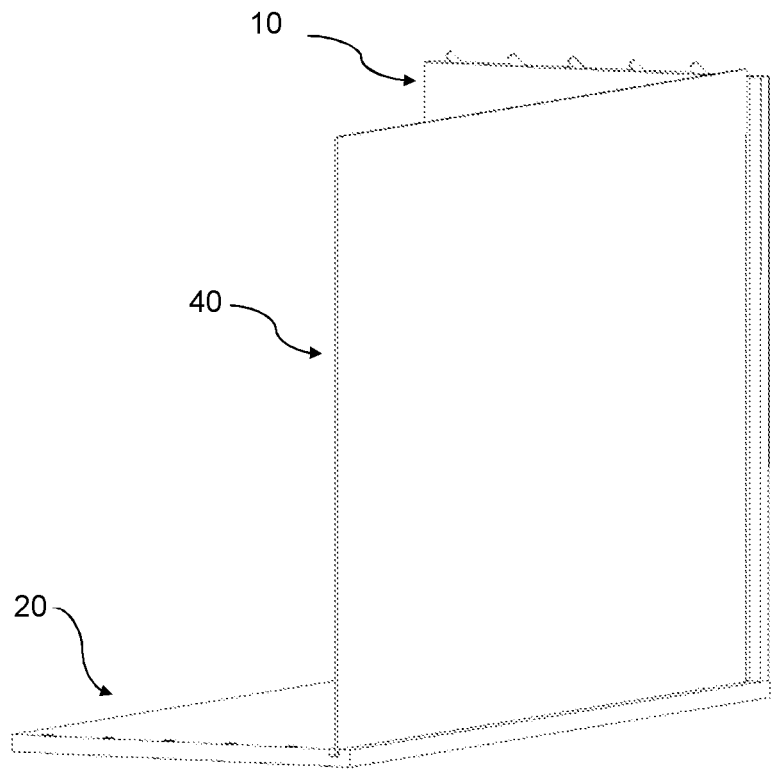
FIG. 4A shows a 3D side view of a set in an assembled state of an aspect of the invention.
Figure 4B:
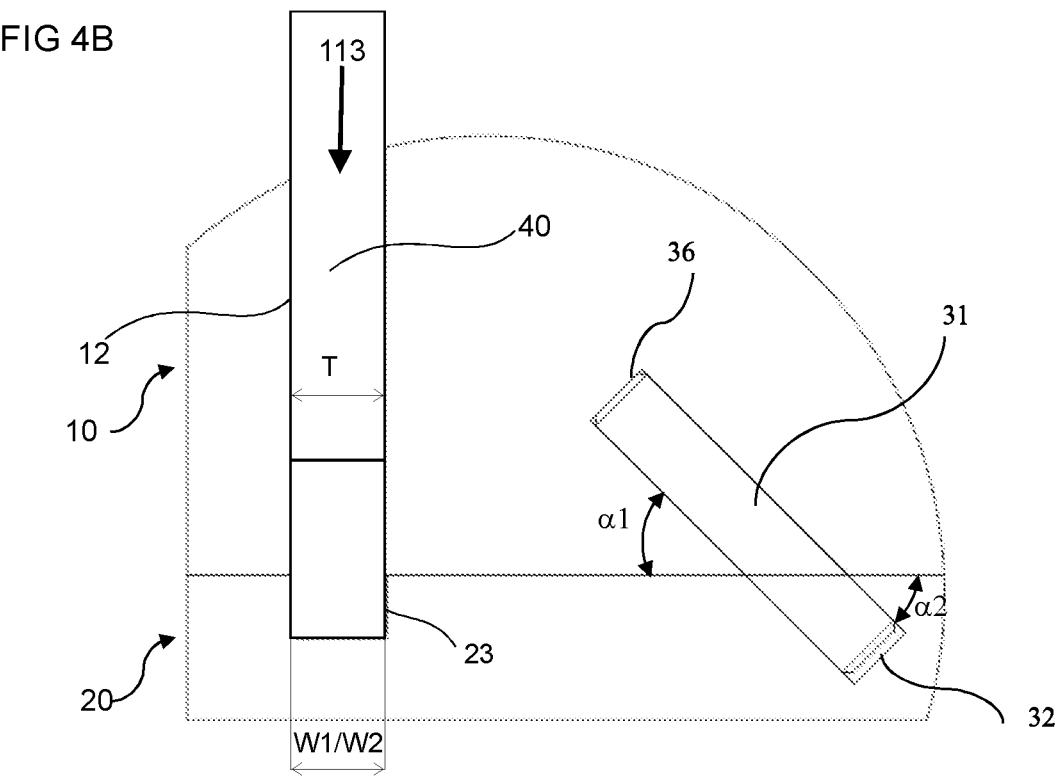
FIG. 4B shows a side view of a set in a partly assembled state of an aspect of the invention.

FIG. 4B shows that the back panel 40 may be assembled to the first 10 and second 20 panel by displacing the back panel 40 relative the first 10 and second 20 panel in an assembly direction 113 which is essentially perpendicular to the second panel surface 22 of the second panel 20. A thickness T of the back panel 40 may be essentially the same as the width W1, W2 of the first 12 and/or second 23 panel groove.

There may be a play between the back panel 40 and the first 12 and/or second 23 panel groove which may facilitate a displacement of an edge of the back panel 40 in the first 12 and/or second 23 panel grooves. The play may be in the range of about 0 mm to about 0.5 mm, or about 0.1 mm to about 0.2.

In one aspect the width W1, W2 of the first 12 and/or second 23 panel groove minus a thickness T of the back panel 40, i.e., ΔW, is equal to or larger than an extension H of the back panel 40 in relation to the first panel 10 or second panel 20 after a first panel 10, a second panel 20 and a back panel 40 have been assembled, i.e., ΔW≥H, see FIG. 10-14.

In one aspect H is less than an extension D of the rod shaped element 31 from the first edge surface 11.

The rod shaped element 31 may have an extension E along the first edge surface 11.

Figure 10:
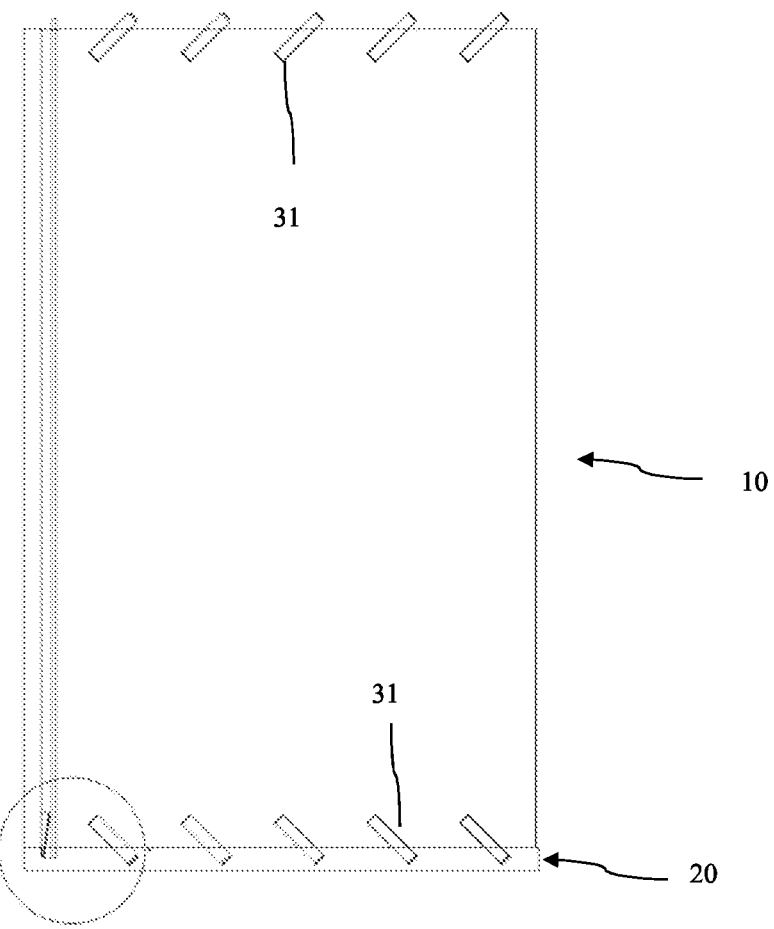
FIG. 10 shows a side view of a set in an assembled state of an aspect of the invention.
Figure 12A:
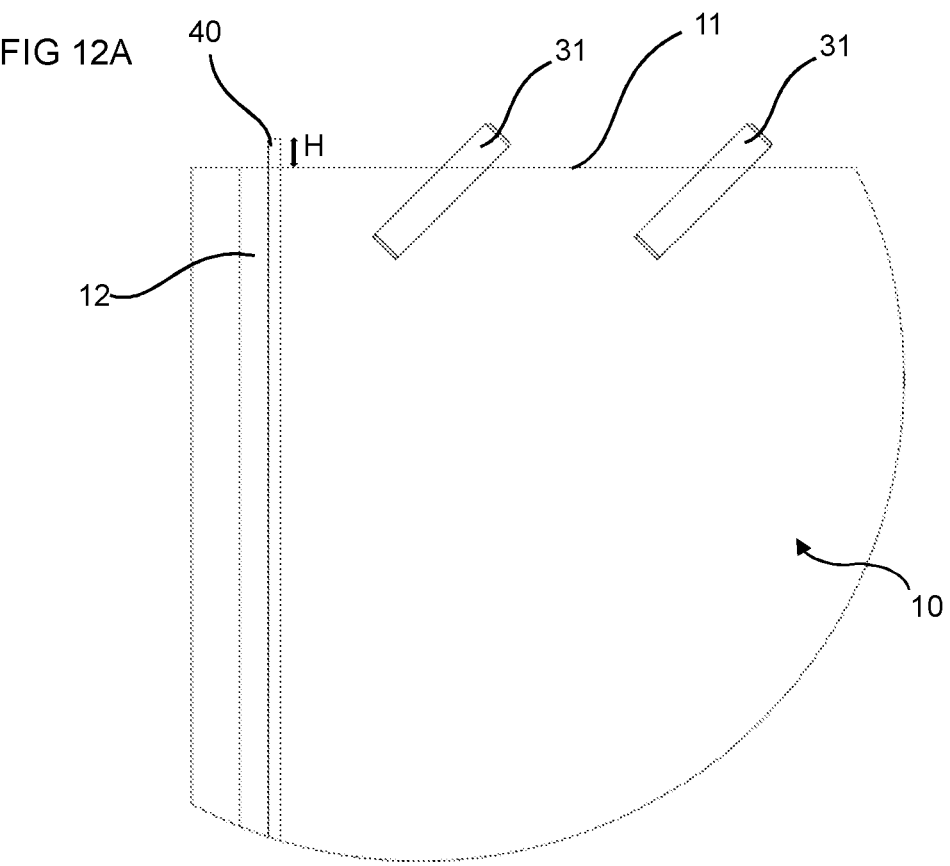
FIG. 12A shows a side view of an enlargement of part of the set shown in FIG. 10.

In one aspect, if a set comprising two of the first panel 10 and two of the second panel 20 are to be assembled, at least one panel 10, 20 may have a width W1, W2 of the first 12 and/or second 23 panel groove that allows for a displacement of an extension H of the back panel 40, see FIGS. 10 and 12A, within the first 12 and/or second 23 panel groove. The displacement may be equal to or larger than ΔW. In one aspect, all panels have the same width W1, W2 of the first 12 and second 23 panel groove to facilitate the production of the panels.

A length of the back panel 40 may be designed to avoid the extension H of the back panel 40. An edge of the back panel 40 may be essentially flush with the first edge 11 surface of the first panel 10.

Figure 12B:
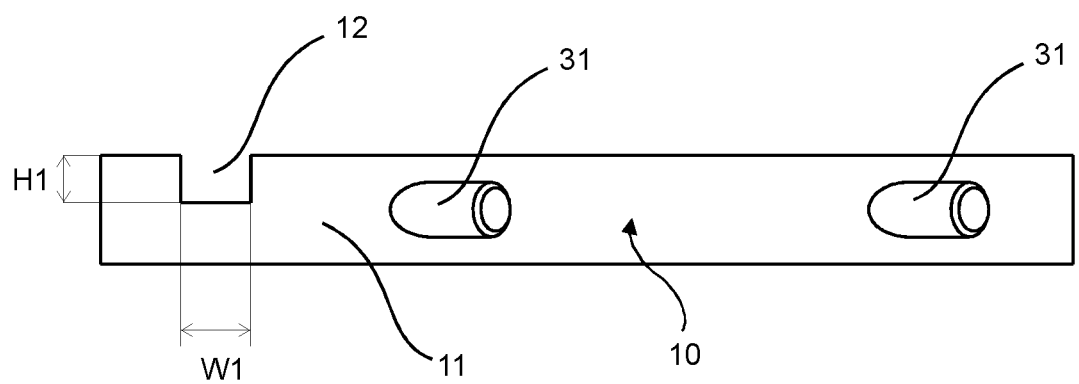
FIG. 12B shows a side view of an embodiment of first panel.

FIG. 12B shows a side view of an embodiment of first panel 10 with the first 12 panel groove. The first 12 panel groove may comprise a width W1 and a height H1.

According to an aspect, when the first panel 10 and the second panel 20 are in an assembled state, but before the locking gear 50 locks the first panel 10 to the second panel 20 and the first panel 10 and the second panel 20 enters the final locked position, the first panel groove 12 and the second panel groove 23 may be displaced about 0.1 mm to about 0.6 mm, or about 0.2 mm to about 0.3 mm, in relation to each other.

The first panel 10 may comprise a second edge surface 14 and the second panel 20 may comprise a third edge surface 24. The first panel groove 12 may be substantially parallel to the second edge surface 14 and the second panel groove 23 may be substantially parallel to the third edge surface 24. The first panel groove 12 may further extend substantially along the entire second edge surface 14 and the second panel groove 23 may extend essentially along the entire third edge surface 24.

The first panel groove 12 and/or the second panel groove 23 may be bottom-ended.

The first 12 and/or second 23 panel groove may be formed by mechanical cutting, such as milling or sawing.

The first panel groove 12 may be formed in the first panel surface 13 and in a core of the first panel 10. The second panel groove 23 may be formed in the second panel surface 22 and in a core of the second panel 20.

In one aspect the locking gear 50 may be at least one wedge that is inserted in the first 12 and/or second 23 panel grooves to lock the first 10 and/or second 20 panels and/or the back panel 40 in position, as shown in FIGS. 5-6 and 10-11.

Figure 5A:
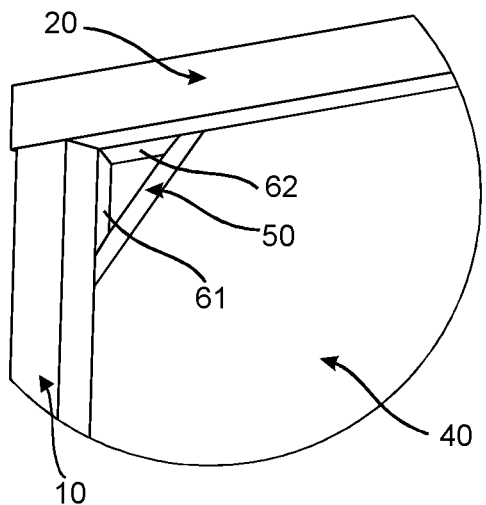
FIGS. 5A-5C show an enlargement of a part of a set in an assembled state, where part of the first and second panel together with a locking gear is enlarged.
Figure 5B:
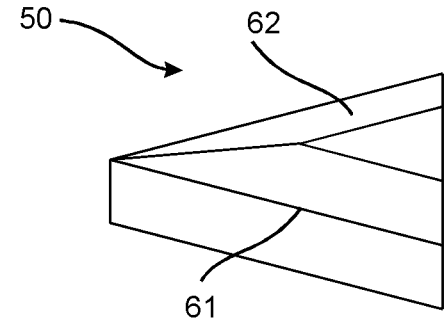
Figure 5C:
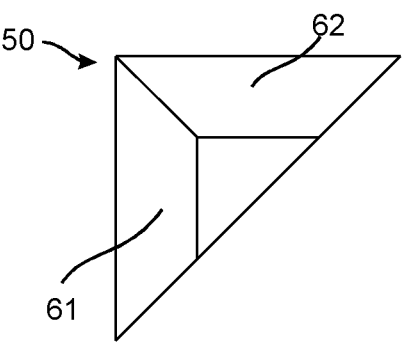

FIGS. 5A-C show an embodiment of the locking gear 50 which comprises a first wedge shaped edge 61 and a second wedge shaped edge 62. The first wedge shaped edge 61 may be inserted in the in the first panel groove 12 and the second wedge shaped edge 62 may be inserted in the in the second panel groove 23 to lock the first panel 10, the second panel 20 and the back panel 40 to a locked position.

Figure 6:
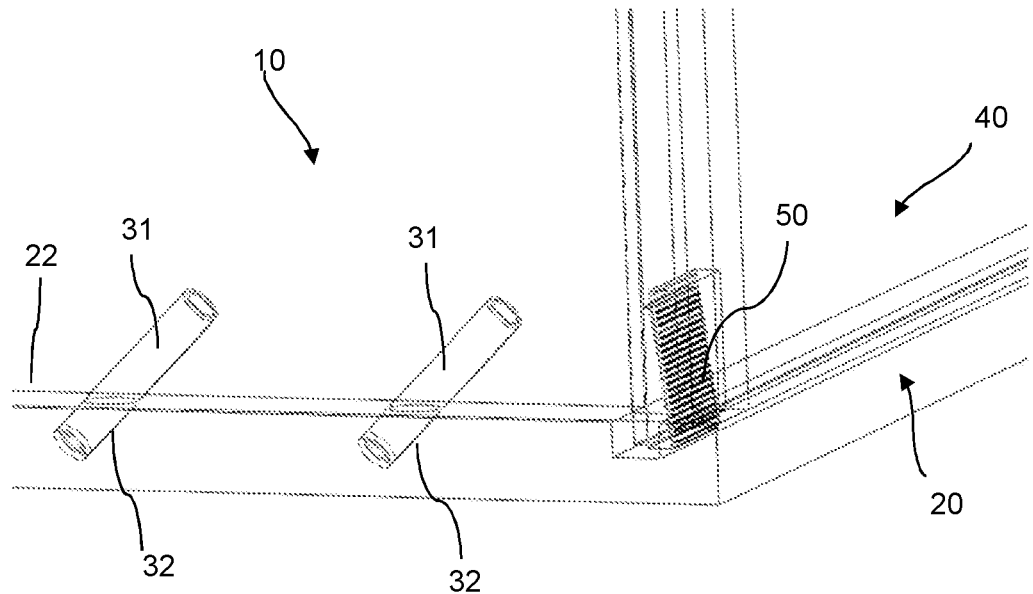
FIG. 6 shows a 3D view of an enlargement of a part of a set in an assembled state.
Figure 7:
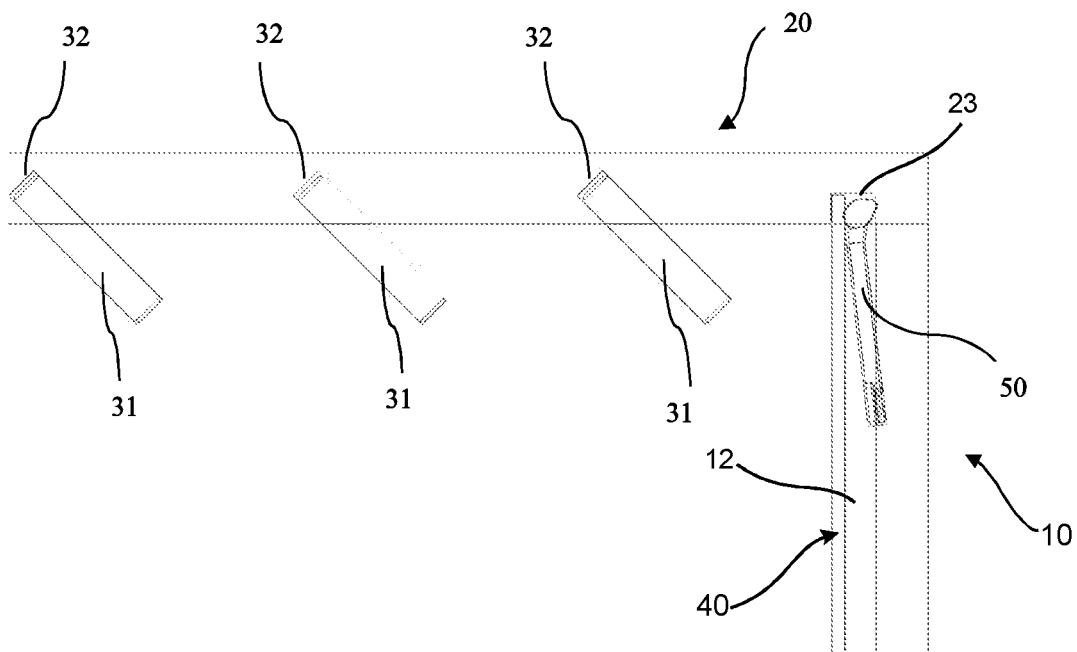
FIG. 7 shows a side view of a set in an assembled state of an aspect of the invention.
Figure 8:
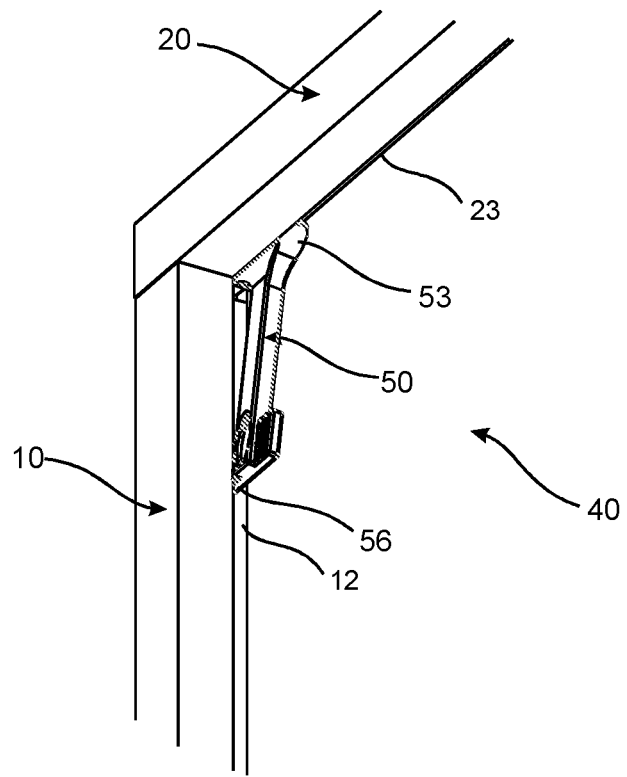
FIG. 8 shows an enlargement of a part of the set in an assembled state according to an aspect of the invention.
Figure 11:
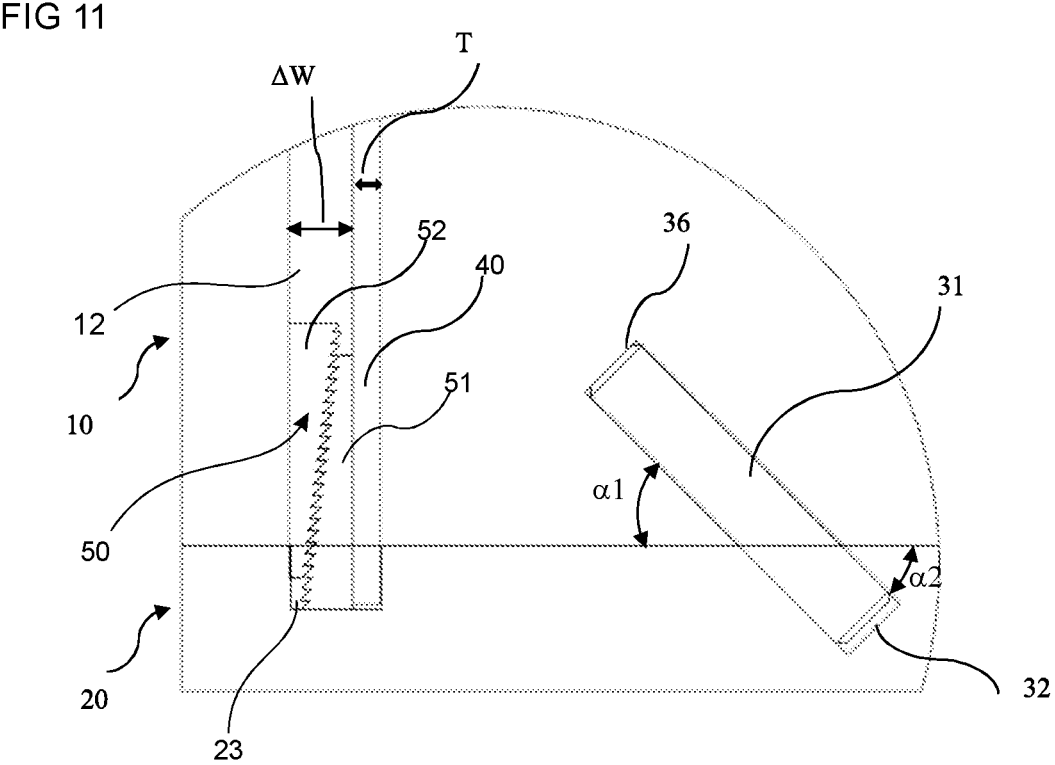
FIG. 11 shows a side view of an enlargement of part of the set shown in FIG. 10.

FIGS. 6 and 11 show an embodiment of the locking gear 50 which comprises a first wedge part 51 and a second wedge part 52.

The locking gear 50 may be made of, e.g., wood based material, metal, a polymer material, etc.

The locking gear 50 may, in one aspect, be rectangular, square or triangular.

The locking gear 50 may be made of, e.g., wood based material, metal, a polymer material, etc.

In one aspect the locking gear 50, as shown in FIGS. 7-9 and 16-18, may comprise a lever arm 54 and an eccentric locking head 53 at a first end of the lever. The locking gear 50 may comprise at an opposite second end of the lever 54 a locking part 56. If the eccentric head 53 is inserted in the first panel groove 12, the locking part 53 may be is inserted in the second panel groove 23, and vice versa.

The lever arm 54 may be elastic to enable bending during the insertion of the locking part 53 may in the first panel groove 12 or the second panel groove 23. The bending of the lever arm 54 may create a locking force between the locking part and the first panel groove 12 or the second panel groove 23.

An outer part 53 of the eccentric locking head 53 may be thicker than a part of the eccentric locking head 53 adjacent the first end of the lever.

An outer part 53 of the eccentric locking head 53 may comprise a friction connection 59 configured to cooperate with the first panel groove 12 or the second panel groove 23.

The locking gear 50 may comprise a polymer material, such as a thermoplastic material, or a metallic material.

Figure 9:
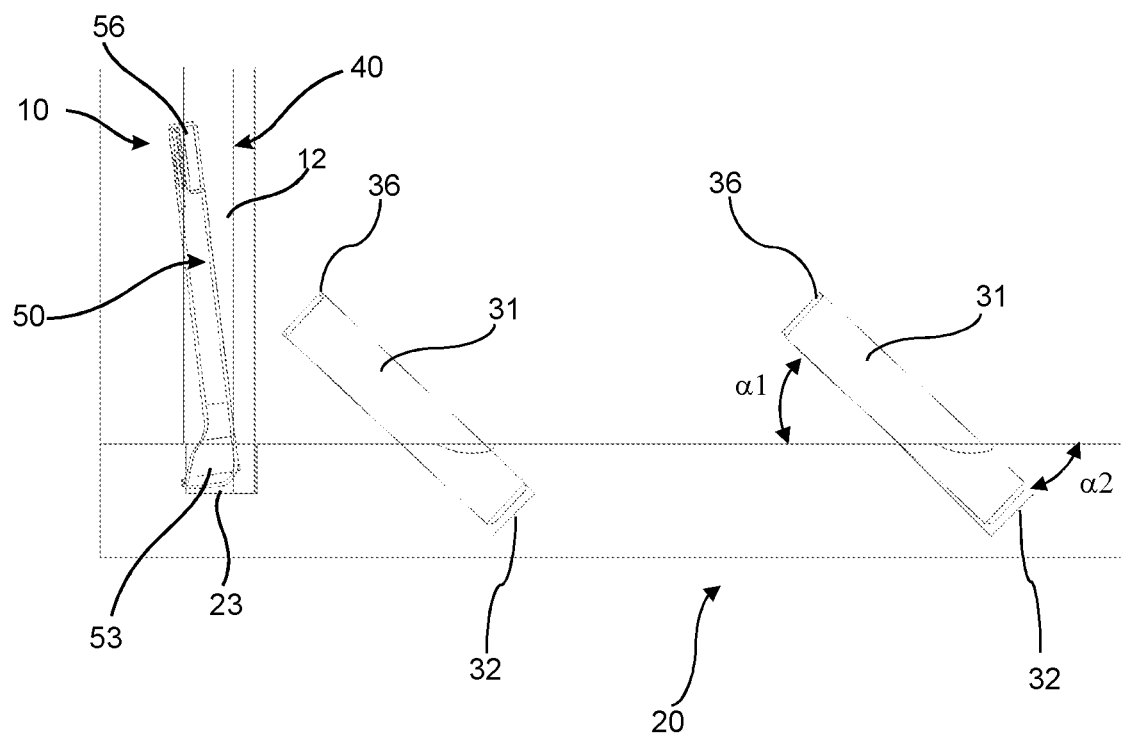
FIG. 9 shows a side view of an enlargement of a set in an assembled state of an aspect of the invention.

FIG. 9 shows an aspect of the invention, where a first panel 10 and a second 20 panel is assembled, where the rod-shaped element 31 extends at a first angle α1 of 47°. The diameter D2 of the insertion groove 32 may be about 0.3 to about 0.8 mm larger than the diameter D1 of the rod-shaped element 31 for optimal assembly.

The first edge surface 11 may comprise two or more of said rod-shaped element 31 and the second panel surface 22 may comprise two or more of said insertion groove 32, and vice versa, which may be arranged linearly, wherein each of the rod-shaped elements 31 is configured to be inserted into one insertion groove 32.

A cross cut of the insertion groove 32, in a plane parallel to the second panel surface 22, which nay have a shape that matches a cross cut of the rod-shaped element 31, in a plane parallel to the first edge surface 11. An advantage of this may be that an improved locking of the first panel 10 to the second panel 20 is obtained and that the assembly of the set of panels is done easily.

The rod-shaped element 31 and the insertion groove 32 are disclosed more in detail in FIGS. 1B, 9, 11 and 14, which show cross cuts along the rod-shaped element 31 and the insertion groove 32. The rod-shaped element 31 extends at a first angle α1 from the first edge surface 11 and the insertion groove 32 extends into the second panel surface at a second angle α2 from the second panel surface 22, as shown in FIG. 14.

Figure 1B:
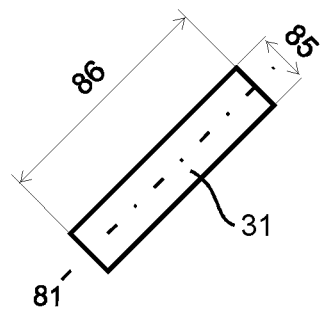
FIG. 1B shows a side view of an embodiment of the rod-shaped element
Figure 2:
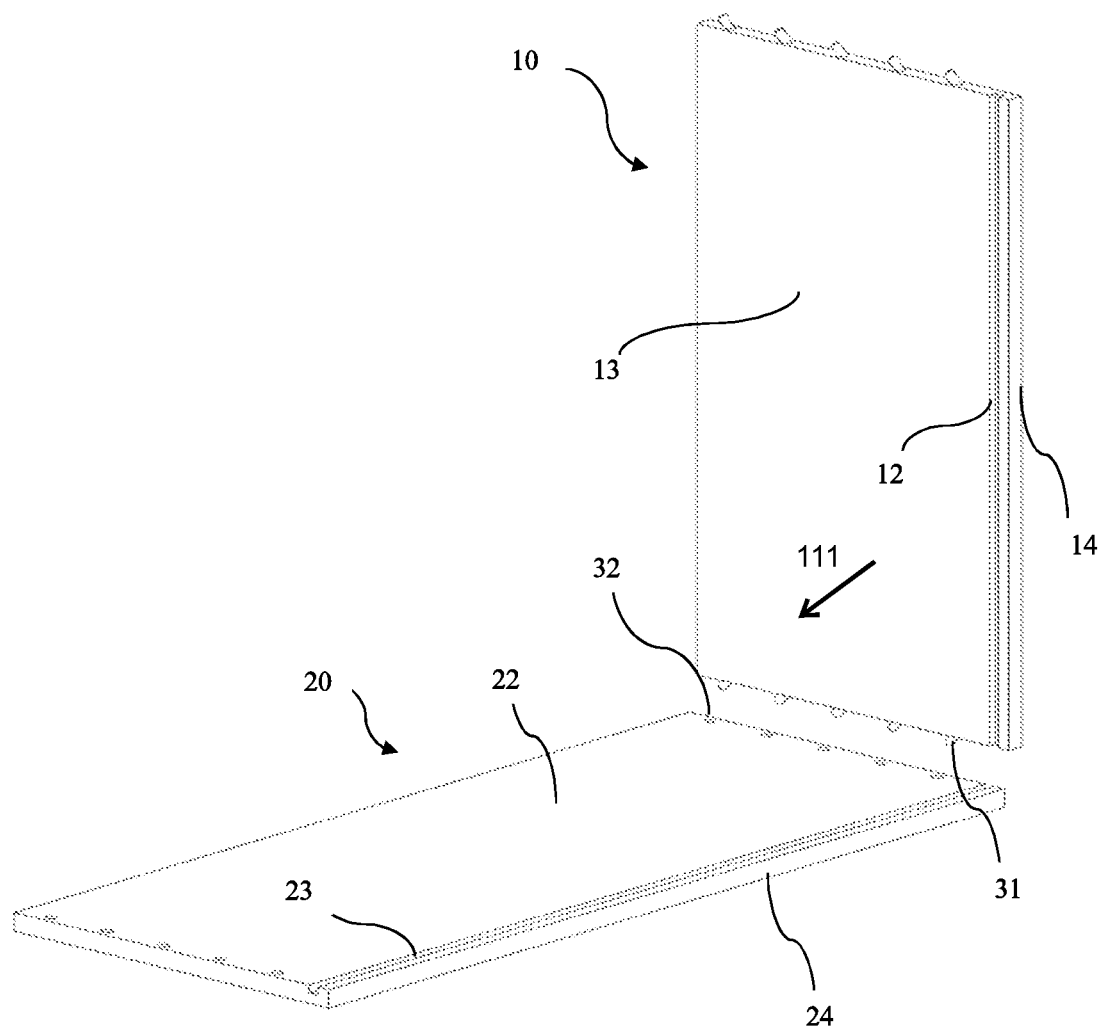
FIG. 2 shows a 3D view from above of a set in an unassembled state of an aspect of the invention.
Figure 3:
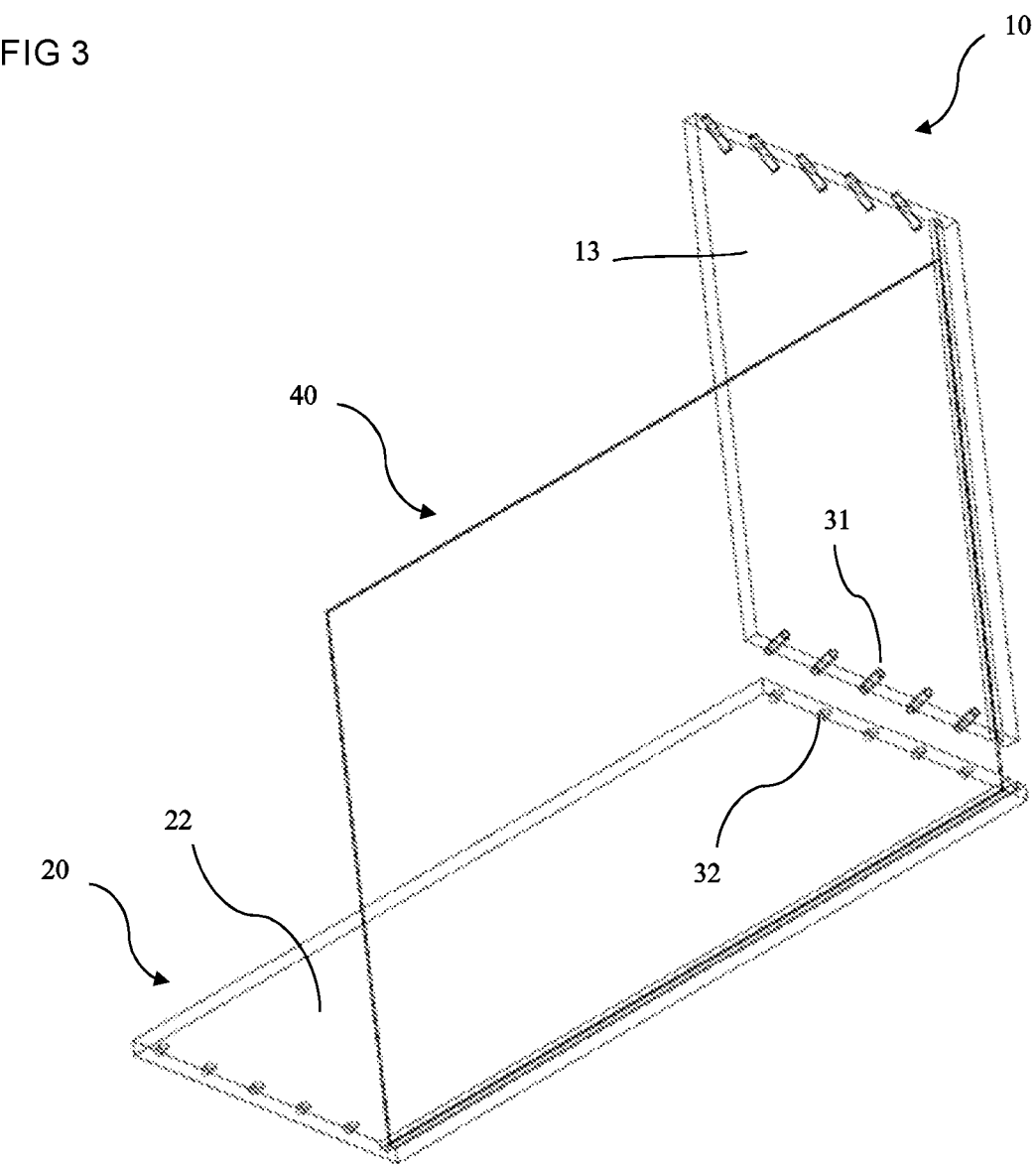
FIG. 3 shows a 3D view from above of a set in an unassembled state of an aspect of the invention.

FIG. 1B shows an embodiment of the rod-shaped element 31 which may be of an elongated shape and comprise a length direction 86, a width direction 85 and a centre line 81 extending in the length direction.

According to an aspect the rod-shaped element 31 is configured to be inserted in the rod element groove 36 on the first edge surface 11.

According to an aspect the rod-shaped element 31 is configured to be inserted in the rod element groove 36 on the second panel surface 22.

According to an aspect the rod-shaped element 31 may be configured to be attached in the rod element groove 36 by friction.

According to an aspect the rod-shaped element 31 may be configured to be glued in the rod element groove 36.

According to an aspect the rod-shaped element 31 and, the rod element groove 36 and the insertion groove 32 may have a substantially circular shape, although other shapes, such as triangular, rectangular, square, etc., are possible.

According to an aspect, when α1≠α2, the extension D of the rod-shaped element 31 may be varied to direct where the largest locking force generated from the locking gear 50 is to be achieved.

According to an aspect, which is shown in FIG. 13, a first edge surface 11 may have at least one element 31, while the opposite edge surface may have at least one insertion groove 32.

According to a further aspect, a first edge surface 11 may have a combination of at least one element 31 and at least one insertion groove 32. A corresponding second panel surface 22 may have a corresponding combination of at least one insertion groove 32 and at least one element 31.

According to an aspect, which is shown in FIG. 14, the position of at least one rod shaped element 31 may be positioned at first distance 83 from the second edge surface 14. The first distance may be measured from the second edge surface 14 to a centre line 81 of the rod shaped element 31. The corresponding insertion groove 32 may be positioned at a second distance 84 from the third edge surface 24. The second distance may be measured from the third edge surface 24 to a centre line 82 of the insertion groove 32. The first distance may be different from the second distance which may increase the locking force.

The difference between the first distance and the second distance may be in the range of about 0.1 mm to about 0.5 mm.

According to an aspect the rod-shaped element 31 is made from one or more of a wood based material, a polymer material, which may comprise reinforcement, such as glass fibre or a metal.

According to an aspect the rod shaped element 31 may have a waxed surface to facilitate assembly.

The rod-shaped element 31 may, according to an aspect, be configured to cooperate, in a locked position, with the bottom surface of the insertion groove 32.

The sidewalls of the insertion groove 32 may comprise material of the core of the first panel 10 or the second panel 20, dependent on in which panel the insertion groove 32 is made and in which panel the rod-shaped element 31 is attached. According to an aspect they may also be enforced with, e.g., metal or glass fibre.

According to an aspect first panel groove 12 and/or the second panel groove 23 may be impregnated/enforced with a liquid.

According to an aspect the first panel 10 and the second panel 20 may be assembled by displacing the first panel 10 relative the second panel 20 in a direction which is essentially parallel with the first panel surface 13.

According to an aspect the first panel 10 comprises two or more of said first edge surfaces 11 according to the above. Put in another way, one or more rod-shaped elements 31 may be positioned at two or more of the edges of the first panel 10, as disclosed in FIGS. 2-3 and 10.

According to an aspect the first panel 10 may comprise two or more of said first edge surface 11 according to the above. Put in another way, one or more of said rod-shaped elements 31 may be positioned at two or more of the edges of the first panel 10, as disclosed in FIGS. 2-4, 9, 11, 12 and 16.

According to an aspect the second panel 20 may comprise two or more of said fourth edge surface 25 according to the above. Put in another way, one or more of said insertion grooves 32 may be positioned adjacent two or more of the edges of the second panel 10, as disclosed in FIGS. 1A, 2-3, 13 and 15.

Figure 15:
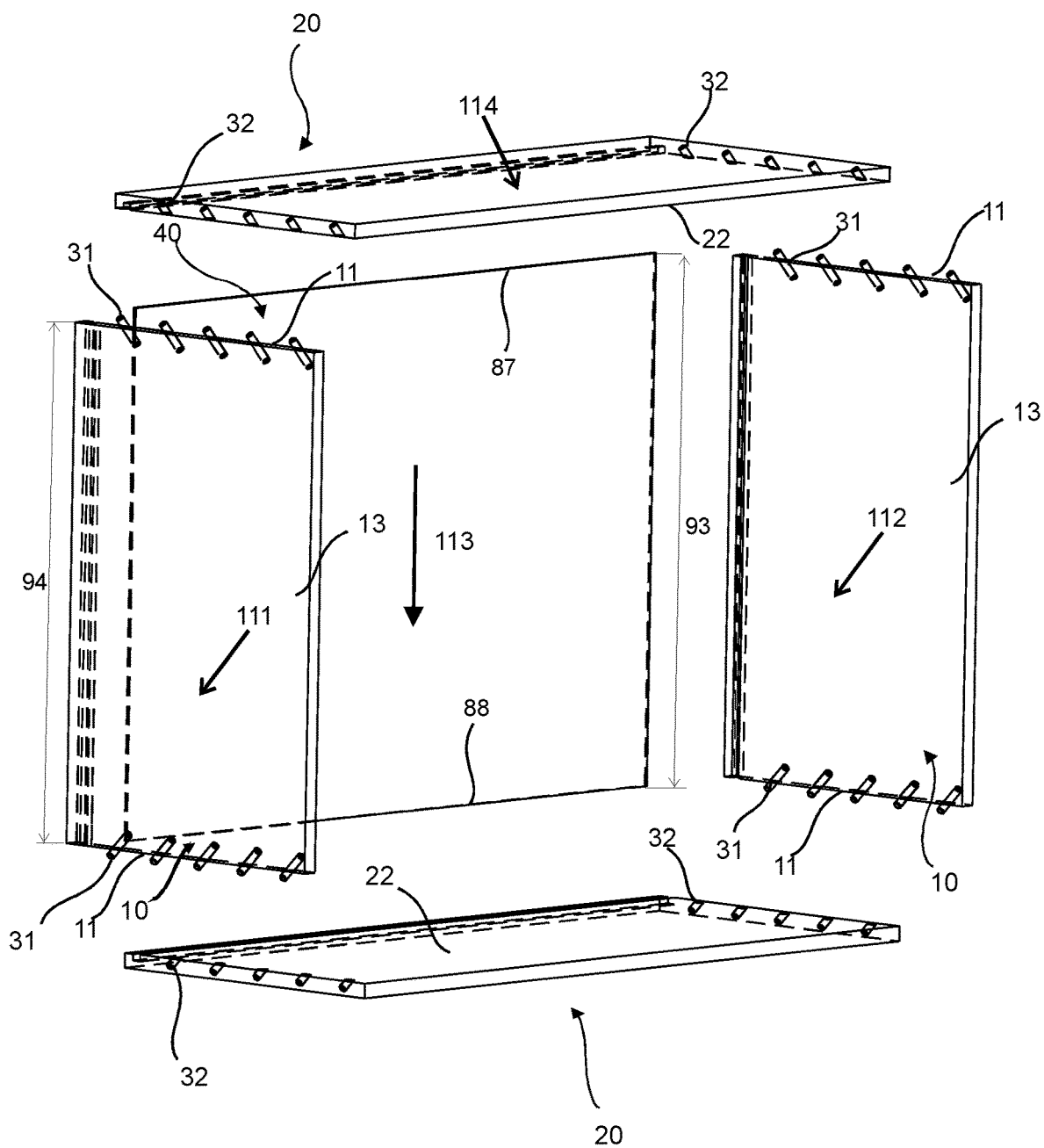
FIG. 15 shows a view of a set comprising two of the first panel, two of the second panel and one back panel in an unassembled state of an aspect of the invention.
Figure 16:
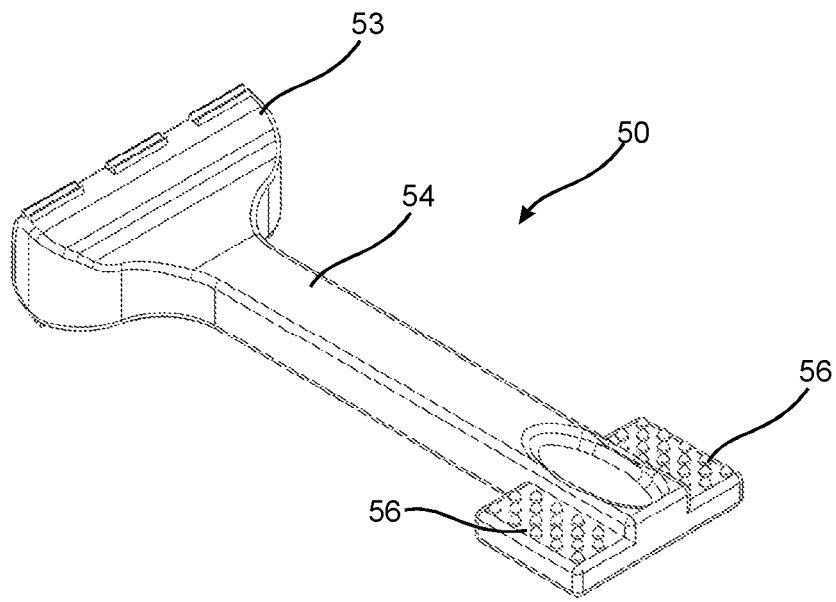
FIGS. 16-18 show enlargements of a locking gear of an aspect of the invention.
Figure 17:
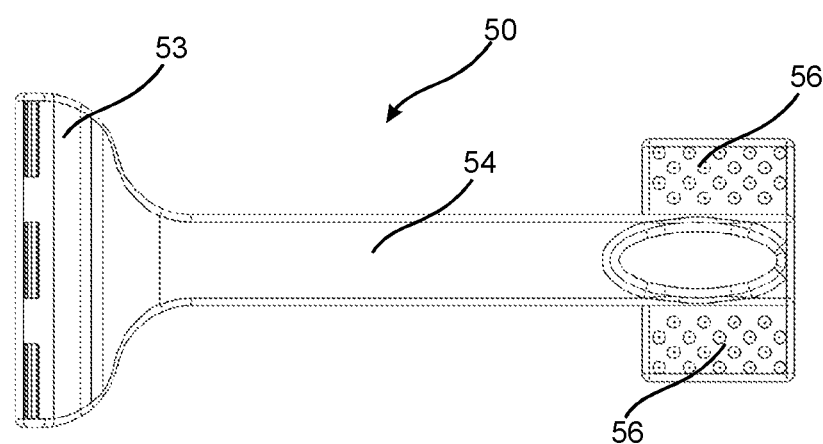
Figure 18:
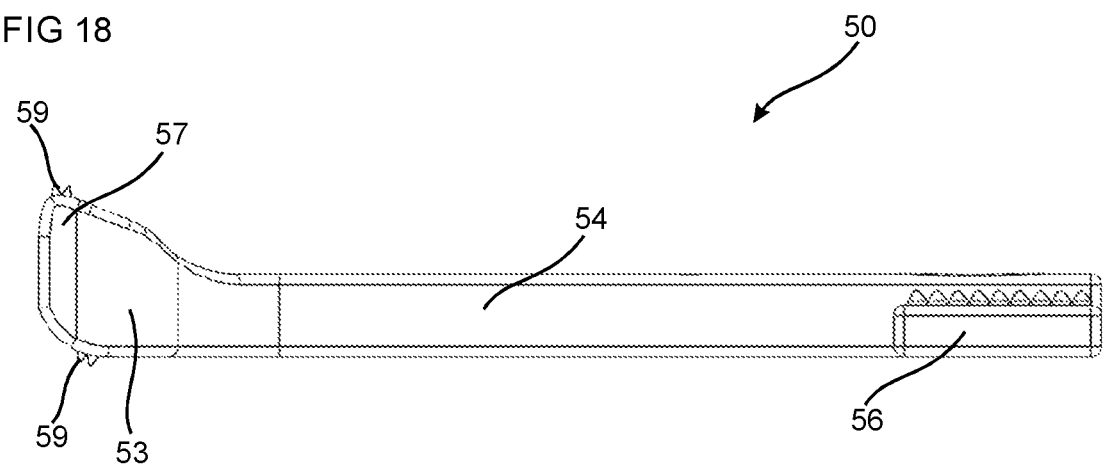

According to an aspect, as shown in FIG. 15, two of the first panels 10, two of the second panels 20, and one back panel 40 may be assembled.

A left embodiment of the of the first panel 10 may be assembled to a bottom embodiment of the second panel 20 by displacing the left embodiment of the first panel 10 relative the bottom embodiment of the second panel 20 in the assembly direction 111. A right embodiment of the of the first panel 10 may be assembled to the bottom embodiment of the second panel 20 by displacing the right embodiment of the first panel 10 relative the bottom embodiment of the second panel 20 in the assembly direction 112. An embodiment of the back panel 40 may be assembled to the left and right embodiment of the first panel 10 and the bottom embodiment of the second panel 20 by displacing the embodiment of the back panel 40 in an assembly direction 113 which is essentially perpendicular to the second panel surface 22 of the bottom embodiment of the second panel 20. A top embodiment of the second panel 20 may be assembled to the left and right embodiment of the first panel 10 and the embodiment of the back panel 40 by displacing the top embodiment of the second panel 20 in the assembly direction 114.

A length 93 of the back panel 40 which in the locked position may be inserted in the panel groove 12 of the first panel 10 may be essentially the same or greater than a length 94 of the first panel 10 at the second edge surface 14 of the first panel. The length 93 of the back panel 40 may be equal to the length 94 of the first panel 10 plus about half the height H1 of the panel groove 12 to about two times the height H1 of the panel groove 12 or equal to the length 94 of the first panel 10 plus the height H1 of the panel groove 12. FIG. 15 shows the length 93 of the back panel 40 which extend between an upper edge 87 of the back panel and a lower edge 88 of the back panel.

FIGS. 19A-D show enlargements of parts of a set during assembling. FIG. 19A shows an embodiment in a first position in which the back panel 40 is inserted in the panel groove 12 of the first panel 10. The upper edge 87 of the back panel 40 is below the first edge surface 11 of the first panel. FIG. 19C shows that in this first position the lower edge 88 of the back panel may contact a lower surface 89 of the panel groove 23 of the lower second panel 20.

FIG. 19B shows the embodiment in a second position in which, an upper second panel 20 has been displaced 114 and assembled to the first panel 10, and the back panel 40 has been displaced to a position in which the upper edge 87 of the back panel 40 is within the panel groove 23 of the upper second panel 20. FIG. 19D shows that in this second position the lower edge 88 of the back panel may be at a distance 91 from the lower surface 89 of the panel groove 23 of the lower second panel 20. The lower edge 88 of the back panel 40 may be positioned at a distance 91 from the second panel surface 22 of the second panel. The distance may be within the range of about ⅓ to about ⅔ a height H2 of the panel groove 23 of the second panel, or about half the height H2 of the panel groove 23 of the second panel.

The height H2 of the panel groove 23 of the lower second panel groove may be greater than the height H2 of the panel groove 23 of the upper second panel groove. The set may be rotated such that the gravity causes the displacement of the back panel to obtain the position in which the upper edge 87 of the back panel 40 is within the panel groove 23 of the upper second panel 20.

The back panel may be displaced by gravity or by hand and the position in which the upper edge 87 of the back panel 40 is within the panel groove 23 of the upper second panel 20 may be maintained by arranging a positioning element 92 between the back panel and the panel groove 12 of the first panel and/or between the back panel and the panel groove 23 of the second panel.

Embodiments of the first panel groove 12 may comprise a width W1 which is essentially the same as a thickness T of the back panel 40. A part of the first panel groove 12 may be wider which may allow an embodiment of the locking gear 50 to be positioned between the back panel and the first panel groove 12 to maintain the position in which the upper edge 87 of the back panel 40 is within the panel groove 23 of the upper second panel 20.

Embodiments of the second panel groove 24 may comprise a width W2 which is essentially the same as a thickness T of the back panel 40. A part of the second panel groove 23 may be wider which may allow an embodiment of the locking gear 50 to be positioned between the back panel 40 and the second panel groove 23 to maintain the position in which the upper edge 87 of the back panel 40 is within the panel groove 23 of the upper second panel 20.

The back panel may be displaceable and the position in which the upper edge 87 of the back panel 40 is within the panel groove 23 of the upper second panel 20 may be maintained by an embodiment of the locking device 4 disclosed in WO2019/125292 or WO2019/125291. The entire contents of WO2019/125292 and WO2019/125291 are hereby incorporated herein by reference in their entirety.

The core of the first panel 10 and/or of the second panel 20 may be a wood-based core, such as MDF, HDF, OSB, WPC, plywood or particleboard. The core may also be a plastic core comprising thermosetting plastic or thermoplastic, e.g., vinyl, PVC, PU or PET. The plastic core may comprise fillers.

The first panel 10 and/or the second panel 20 may also be of solid wood.

The first panel 10 and/or the second panel 20 may be provided with a decorative layer, such as a foil or a veneer, on one or more surfaces.

According to an aspect the set of panels are resilient panels. The resilient panels may comprise a core comprising thermoplastic material. The thermoplastic material may be foamed.

The thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers.

The aspects described above may comprise a decorative layer, such as a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil is may be printed, for example by direct printing, rotogravure, or digital printing. According to an aspect the decorative layer comprises melamine, a high pressure laminate (HPL) or a veneer.

The aspects described above may comprise a wear layer such as a film or foil. The wear layer may comprise thermoplastic material. The thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The aspects described above may comprise a wood base core, such as HDF, MDF, plywood, particleboard, OSB or Masonite.

The different aspects, embodiments and alternatives described above may be combined with one or more of the other described aspects, embodiments and alternatives.

EMBODIMENTS

1. A set comprising a first panel (10), a second panel (20) and a mechanical locking device for locking the first panel (10) to the second panel (20), wherein
   the first panel (10) comprises a first edge surface (11),
   the second panel (20) comprises a second panel surface (22),
   the first edge surface (11) is facing or parallel to the second panel surface (22) in a locked position of the first and the second panel (10, 20),
   the mechanical locking device comprises at least one rod-shaped element (31) at the first edge surface (11) and at least one insertion groove (32) at the second panel surface (22),
   the rod-shaped element (31) is configured to be inserted into the insertion groove (32),
   the rod-shaped element (31) extends at a first angle ($\alpha$1) from the first edge surface (11),
   the insertion groove (32) extends into the second panel surface (22) at a second angle ($\alpha$2) from the second panel surface (22),
   the mechanical locking device further comprises at least one of a first panel groove (12) on a first panel surface (13) on the first panel (10), and a second panel groove (23) on the second panel surface (22) of the second panel (20),
   a back panel (40) configured to be inserted in and to cooperate with at least one of the first panel groove (12) and the second panel groove (23),
   wherein the first angle ($\alpha$1) is within the range of about 30° to about 60°, or within the range of about 40° to about 50°, or about 45°, and
   at least one locking gear (50) configured to cooperate with the back panel (40) and at least one of the first panel groove (12) and the second panel groove (23), for locking of the first panel (10) to the second panel (20).
2. The set as in embodiment 1, wherein a width (W1, W2) of at least one of the first panel groove (12) and the second panel groove (23) minus a thickness (T) of the back panel (40) is larger than or essentially the same as an extension (E) of the rod-shaped element (31) along the first edge surface (11).
3. The set as in any of the preceding embodiments, wherein the rod-shaped element (31) is arranged in a rod element groove (36) in the first edge surface (11).
4. The set as in any of the preceding embodiments, wherein the width (W1) of the first panel groove (12) is essentially the same as the width (W2) of the second panel groove (23).
5. The set as in any of the preceding embodiments, wherein the first panel (10) comprises a second edge surface (14), the second panel (20) comprises a third edge surface (24), the first panel groove (12) is substantially parallel to the second edge surface (14) and the second panel groove (23) is substantially parallel to the third edge surface (24).
6. The set as in any of the preceding embodiments, wherein the first panel groove (12) extends substantially along the entire second edge surface (14) and the second panel groove (23) extends essentially along the entire third edge surface (24).
7. The set as in any of the preceding embodiments, wherein at least one of the first panel groove (12) and the second panel groove (23) is bottom-ended.
8. The set as in any of the preceding embodiments, wherein the locking gear (50) is configured to further cooperate with the back panel (40), for locking of the back panel (40) to the first (10) and/or second (20) panel.
9. The set as in any of the preceding embodiments, wherein the locking gear (50) is flexible.
10. The set as in any of the preceding embodiments, wherein the locking gear (50) comprises a spring.
11. The set as in any of embodiments 1-9, wherein the locking gear (50) comprises a wedge element.
12. The set as in any of the previous embodiments, wherein an extension (H) of the back panel from the first edge (11) of the first panel (10), when one first panel, one second panel and one back panel have been assembled, is less than an extension of the rod shaped element (31) from the first edge surface (11) of the first panel (10).

The invention claimed is:

1. A set comprising a first panel, a second panel and a mechanical locking device for locking the first panel to the second panel, wherein:
   the first panel comprises a first edge surface,
   the second panel comprises a second panel surface,
   the first edge surface is facing or parallel to the second panel surface in a locked position of the first and the second panel,
   the mechanical locking device comprises at least one rod-shaped element at the first edge surface and at least one insertion groove at the second panel surface,
   the rod-shaped element is configured to be inserted into the insertion groove,
   the rod-shaped element extends at a first angle from the first edge surface,
   the insertion groove extends into the second panel surface at a second angle from the second panel surface,
   the first angle is within the range of about 30° to about 60°, and
   the mechanical locking device further comprises:
      a first panel groove on a first panel surface on the first panel, and a second panel groove on the second panel surface of the second panel,
      a back panel configured to be inserted in and to cooperate with the first panel groove and the second panel groove, and
      at least one locking gear comprising a lever arm, a locking head at a first end of the lever arm, and a locking part at a second end of the lever arm, wherein the first end is opposite of the second end, and wherein the at least one locking gear is configured for locking of the first panel to the second panel by inserting the locking head into the first panel groove and inserting the locking part into the second panel groove, or vice versa.

2. The set as claimed in claim 1, wherein a width of at least one of the first panel groove and the second panel groove minus a thickness of the back panel is larger than or essentially the same as an extension of the rod-shaped element along the first edge surface.

3. The set as claimed in claim 1, wherein the rod-shaped element is arranged in a rod element groove in the first edge surface.

4. The set as claimed in claim 1, wherein the width of the first panel groove is essentially the same as the width of the second panel groove.

5. The set as claimed in claim 1, wherein the first panel comprises a second edge surface, the second panel comprises a third edge surface, the first panel groove is substantially parallel to the second edge surface and the second panel groove is substantially parallel to the third edge surface.

6. The set as claimed in claim 5, wherein the first panel groove extends substantially along the entire second edge surface and the second panel groove extends essentially along the entire third edge surface.

7. The set as claimed in claim 1, wherein at least one of the first panel groove and the second panel groove is bottom-ended.

8. The set as claimed in claim 1, wherein the locking gear is flexible.

9. The set as claimed in claim 1, wherein an extension of the back panel from the first edge of the first panel, when the first panel, the second panel and the back panel have been assembled, is less than an extension of the rod shaped element from the first edge surface of the first panel.

10. The set as claimed in claim 1, wherein the locking head is an eccentric locking head.

11. The set as claimed in claim 10, wherein an outer part of the eccentric locking head is thicker than a part of the eccentric locking head adjacent a first end of the lever arm.

12. The set as claimed in claim 10, wherein an outer part of the eccentric locking head comprises a friction connection configured to cooperate with the first panel groove or the second panel groove.

13. The set as claimed in claim 1, wherein the lever arm is elastic and configured to bend during the insertion of the locking part into the first panel groove or the second panel groove.

14. The set as claimed in claim 13, wherein bending of the lever arm creates a locking force between the locking part and the first panel groove or the second panel groove.

15. The set as claimed in claim 13, wherein the locking gear comprises a polymer material.

16. The set as claimed in claim 13, wherein the locking gear comprises a thermoplastic material.

\* \* \* \* \*